(12) United States Patent
Heil et al.

(10) Patent No.: US 9,983,938 B2
(45) Date of Patent: May 29, 2018

(54) LOCALLY RESTORING FUNCTIONALITY AT ACCELERATION COMPONENTS

(71) Applicant: Microsoft Technology Licensing, LLC, Redmond, WA (US)

(72) Inventors: Stephen F. Heil, Sammamish, WA (US); Sitaram V. Lanka, Mercer Island, WA (US); Adrian M. Caulfield, Woodinville, WA (US); Eric S. Chung, Woodinville, WA (US); Andrew R. Putnam, Seattle, WA (US); Douglas C. Burger, Bellevue, WA (US); Yi Xiao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 14/752,802

(22) Filed: Jun. 26, 2015

(65) Prior Publication Data

US 2016/0306701 A1    Oct. 20, 2016

Related U.S. Application Data

(60) Provisional application No. 62/149,305, filed on Apr. 17, 2015.

(51) Int. Cl.
G06F 11/00 (2006.01)
G06F 11/14 (2006.01)
(Continued)

(52) U.S. Cl.
CPC ........ *G06F 11/1441* (2013.01); *G06F 9/5027* (2013.01); *G06F 9/5061* (2013.01);
(Continued)

(58) Field of Classification Search
CPC ............. G06F 11/0709; G06F 11/0721; G06F 11/0736; G06F 11/0793; G06F 11/142;
(Continued)

(56) References Cited

U.S. PATENT DOCUMENTS 6,104,211 A * 8/2000 Alfke .................... G06F 11/142
326/10
7,020,860 B1    3/2006 Zhao et al.
(Continued)

FOREIGN PATENT DOCUMENTS

WO    2013167326 A1    11/2013

OTHER PUBLICATIONS

McLoughlin, "Achieving Low-cost High-Reliability Computation Through Redundant Parallel Processing", In Proceedings of International Conference on Computing & Informatics, Jun. 6, 2006, 6 pages.
(Continued)

*Primary Examiner* — Gabriel Chu

(57) ABSTRACT

Aspects extend to methods, systems, and computer program products for locally restoring functionality at acceleration components. A role can be locally restored at an acceleration component when an error is self-detected at the acceleration component (e.g., by local monitoring logic). Locally restoring a role can include resetting internal state (application logic) of the acceleration component providing the role. Self-detection of errors and local restoration of a role is less resource intensive and more efficient than using external components (e.g., high-level services) to restore functionality at an acceleration component and/or to reset an entire graph. Monitoring logic at multiple acceleration components can locally reset roles in parallel to restore legitimate behavior of a graph.

20 Claims, 19 Drawing Sheets

(51) Int. Cl.
G06F 9/50 (2006.01)
G06F 11/07 (2006.01)
G06F 11/277 (2006.01)

(52) U.S. Cl.
CPC ...... *G06F 11/0709* (2013.01); *G06F 11/0724* (2013.01); *G06F 11/0793* (2013.01); *G06F 11/277* (2013.01); *G06F 2201/805* (2013.01)

(58) Field of Classification Search
CPC ............. G06F 11/1438; G06F 11/1441; G06F 11/3013; G06F 15/7867; G06F 15/7882; G06F 15/7889; G06F 15/7892; G06F 17/5022; G06F 17/5027
See application file for complete search history.

(56) References Cited

U.S. PATENT DOCUMENTS

| | | | |
|---|---|---|---|
| 7,036,059 B1* | 4/2006 | Carmichael | G06F 11/1004 714/725 |
| 7,263,631 B2 | 8/2007 | VanBuren | |
| 7,286,020 B1 | 10/2007 | O et al. | |
| 7,340,596 B1* | 3/2008 | Crosland | G06F 1/24 713/1 |
| 7,389,460 B1 | 6/2008 | Demara | |
| 7,444,551 B1* | 10/2008 | Johnson | G06F 11/0745 714/41 |
| 7,822,958 B1* | 10/2010 | Allen | G06F 9/4401 326/41 |
| 8,117,497 B1 | 2/2012 | Lesea | |
| 8,117,512 B2 | 2/2012 | Sorensen et al. | |
| 8,127,113 B1 | 2/2012 | Sinha et al. | |
| 8,145,894 B1 | 3/2012 | Casselman | |
| 8,453,013 B1* | 5/2013 | Chen | G06F 11/0709 714/13 |
| 8,554,953 B1 | 10/2013 | Sorensen et al. | |
| 8,635,675 B2* | 1/2014 | Kruglick | G06F 21/629 726/4 |
| 2008/0120500 A1* | 5/2008 | Kimmery | G06F 11/2025 713/100 |
| 2008/0307259 A1 | 12/2008 | Vasudevan et al. | |
| 2009/0147945 A1 | 6/2009 | Doi et al. | |
| 2013/0159452 A1 | 6/2013 | Saldana De Fuentes et al. | |
| 2013/0227335 A1 | 8/2013 | Dake et al. | |
| 2013/0305199 A1 | 11/2013 | He et al. | |
| 2014/0095928 A1* | 4/2014 | Ogasawara | G06F 11/0721 714/15 |
| 2014/0245061 A1 | 8/2014 | Kobayashi | |
| 2014/0267328 A1 | 9/2014 | Banack et al. | |
| 2014/0280499 A1 | 9/2014 | Basavaiah et al. | |
| 2014/0310555 A1* | 10/2014 | Schulz | G06F 11/2002 714/4.2 |
| 2015/0379100 A1* | 12/2015 | Vermeulen | G06F 17/30575 707/620 |
| 2016/0154694 A1* | 6/2016 | Anderson | G06F 11/0793 714/6.2 |

OTHER PUBLICATIONS

Krieg, et al., "Run-Time FPGA Health Monitoring using Power Emulation Techniques", In Proceedings of IEEE 54th International Midwest Symposium on Circuits and Systems, Aug. 7, 2011, 4 pages.
Paulsson, et al., "Methods for Run-time Failure Recognition and Recovery in dynamic and partial Reconfigurable Systems Based on Xilinx Virtex-II Pro FPGAs", In Proceedings of IEEE Computer Society Annual Symposium on Emerging VLSI Technologies and Architectures, Mar. 2, 2006, 6 pages.
Adler, et al., "Leap Scratchpads: Automatic Memory and Cache Management for Reconfigurable Logic", In Proceedings of 19th ACM/SIGDA International Symposium on Field Programmable Gate Arrays, Feb. 27, 2011, pp. 25-28.
Putnam, et al. "A Reconfigurable Fabric for Accelerating Large-Scale Datacenter Services", In Proceedings of ACM/IEEE 41st International Symposium on Computer Architecture, Jun. 14, 2014, pp. 1-12.
"Stratix V Device Handbook", Published on: Sep. 30, 2014 Available at: http://www.altera.com/literature/hb/stratix-v/stratix5_handbook.pdf.
Baxter, et al., "Maxwell—a 64 FPGA Supercomputer", In Proceedings of Second NASA/ESA Conference on Adaptive Hardware and Systems, Aug. 5, 2007, 8 pages.
"BEE4 Hardware Platform", Retrieved on: Feb. 26, 2015 Available at: http://beecube.com/downloads/BEE42pages.pdf.
Blott, et al., "Dataflow Architectures for 10Gbps Line-Rate Key-Value Stores", In Proceedings of Symposium on High Performance Chips, Aug. 25, 2013, pp. 1-25.
Chung, et al., "CoRAM: An In-fabric Memory Architecture for FPGA-based Computing", In Proceedings of 19th ACM/SIGDA International Symposium on Field Programmable Gate Arrays, Feb. 27, 2011, pp. 97-106.
"The Convey H C—2™ Computer", In Convey White Paper, Retrieved on: Feb. 26, 2015, 10 pages.
"Cray XD1 Datasheet", Retrieved on: Feb. 26, 2015 Available at: http://www.carc.unm.edu/~tlthomas/buildout/Cray_XD1_Datasheet.pdf.
Estlick, et al., "Algorithmic Transformations in the Implementation of K-Means Clustering on Reconfigurable Hardware", In Proceedings of ACM/SIGDA Ninth International Symposium on Field Programmable Gate Arrays, Feb. 1, 2001, pp. 103-110.
George, et al., "Novo-G: At the Forefront of Scalable Reconfigurable Supercomputing", In Journal of Computing in Science & Engineering, vol. 13, Issue 1, Jan. 2011, pp. 82-86.
Hussain, et al., "Highly Parameterized K-means Clustering on FPGAs: Comparative Results with GPPs and GPUs", In Proceedings of International Conference on Reconfigurable Computing and FPGAs, Nov. 30, 2011, pp. 475-480.
"IBM PureData System for Analytics N2001", Retrieved on: Feb. 26, 2015 Available at: http://public.dhe.ibm.com/common/ssi/ecm/wa/en/wad12353usen/WAD12353USEN.PDF.
"An Introduction to the Intel Quickpath Interconnect", In White Paper, Jan. 2009, pp. 1-22.
Kirchgessner, et al., "VirtualRC: A Virtual FPGA Platform for Applications and Tools Portability", In Proceedings of ACM/SIGDA International Symposium on Field Programmable Gate Arrays, Feb. 22, 2012, pp. 205-208.
Lavasani, et al., "An FPGA-based In-line Accelerator for Memcached", In Proceedings of IEEE Computer Architecture Letters, vol. 13, No. 2, Jul. 15, 2013, pp. 57-60.
Ling, et al., "High-Performance, Energy-Efficient Platforms using In-Socket FPGA Accelerators", In Proceedings of ACM/SIGDA International Symposium on Field Programmable Gate Arrays, Feb. 22, 2009, pp. 261-264.
"How Microsoft Designs its Cloud-Scale Servers", Retrieved on: Feb. 26, 2015 Available at: https://www.google.co.in/url?sa=t&rct=j&q=&esrc=s&source=web&cd=1&ved=0CB0QFjAA&url=http%3A%2F%2Fdownload.microsoft.com%2Fdownload%2F5%2F7%2F6%2F576F498A-2031-4F35-A156-BF8DB1ED3452%2FHow_MS_designs_its_cloud_scale_servers_strategy_paper.
Pell, et al., "Surviving the End of Frequency Scaling with Reconfigurable Dataflow Computing", In Proceedings of ACM SIGARCH Computer Architecture News, vol. 39, Issue 4, Sep. 2011, pp. 60-65
Showerman, et al., "QP: A Heterogeneous Multi-Accelerator Cluster", In Proceedings of 10th LCI International Conference on High-Performance Clustered Computing, Mar. 10, 2009, pp. 1-8.
Slogsnat, et al., "An Open-source HyperTransport Core", In Journal of ACM Transactions on Reconfigurable Technology and Systems, vol. 1, Issue 3, Sep. 1, 2008, pp. 1-21.
So, et al., "A Unified Hardware/Software Runtime Environment for FPGA-based Reconfigurable Computers Using BORPH", In Journal of ACM Transactions on Embedded Computing Systems, vol. 7, Issue 2, Feb. 1, 2008, pp. 1-28.

(56) References Cited

OTHER PUBLICATIONS

"SRC® MAPstation™ Systems", Retrieved on: Feb. 26, 2015 Available at: http://www.srccomp.com/sites/default/files/pdf/SRC7_MAPstation_70000-AG.pdf.

Vanderbauwhede, et al., "FPGA-accelerated Information Retrieval: High-Efficiency Document Filtering", In Proceedings of International Conference on Field Programmable Logic and Applications, Aug. 31, 2009, pp. 417-422.

Yan, et al., "Efficient Query Processing for Web Search Engine with FPGAs", In Proceedings of IEEE 20th International Symposium on Field-Programmable Custom Computing Machines, Apr. 29, 2012, pp. 97-100.

Bolchini, et al. "A Reliable Reconfiguration Controller for Fault-Tolerant Embedded Systems on Multi-FPGA Platforms", In Proceedings of the IEEE 25th International Symposium on Defect and Fault Tolerance in VLSI Systems, Oct. 6, 2010, 9 pages.

Part 1 of 4—"Nios II Processor Reference Handbook", Published on: Feb. 2014 Available at http://www.altera.com/literature/hb/nios2/in2cpu_nii5v1.pdf, pp. 1-60.

Part 2 of 4—"Nios II Processor Reference Handbook", Published on: Feb. 2014 Available at http://www.altera.com/literature/hb/nios2/in2cpu_nii5v1.pdf, pp. 61-120.

Part 3 of 4—"Nios II Processor Reference Handbook", Published on: Feb. 2014 Available at http://www.altera.com/literature/hb/nios2/in2cpu_nii5v1.pdf, pp. 121-180.

Part 4 of 4—"Nios II Processor Reference Handbook", Published on: Feb. 2014 Available at http://www.altera.com/literature/hb/nios2/in2cpu_nii5v1.pdf, pp. 181-288.

Stott, et al., "Degradation in FPGAs: Measurement and Modelling", In Proceedings of the 18th Annual ACM/SIGDA International Symposium on Field Programmable Gate Array, Feb. 21, 2010, 10 pages.

Part 1 of 4—Stott, A. Edward, "Degradation Analysis and Mitigation in Field Programmable Gate Arrays", In thesis Presented for the Degree of Doctor of Philosophy, Sep. 2011, pp. 1-35.

Part 2 of 4—Stott, A. Edward, "Degradation Analysis and Mitigation in Field Programmable Gate Arrays", In thesis Presented for the Degree of Doctor of Philosophy, Sep. 2011, pp. 36-70.

Part 3 of 4—Stott, A. Edward, "Degradation Analysis and Mitigation in Field Programmable Gate Arrays", In thesis Presented for the Degree of Doctor of Philosophy, Sep. 2011, pp. 71-105.

Part 4 of 4—Stott, A. Edward, "Degradation Analysis and Mitigation in Field Programmable Gate Arrays", In thesis Presented for the Degree of Doctor of Philosophy, Sep. 2011, pp. 106-128.

Part 1 of 6—"MicroBlaze Processor Reference Guide", Retrieved on: Feb. 26, 2015, pp. 1-40 Available at: http://www.xilinx.com/support/documentation/sw_manuals/xilinx14_2/mb_ref guide.pdf.

Part 2 of 6—"MicroBlaze Processor Reference Guide", Retrieved on: Feb. 26, 2015, pp. 41-75 Available at: http://www.xilinx.com/support/documentation/sw_manuals/xilinx14_2/mb_ref_guide.pdf.

Part 3 of 6—"MicroBlaze Processor Reference Guide", Retrieved on: Feb. 26, 2015, pp. 76-116 Available at: http://www.xilinx.com/support/documentation/sw_manuals/xilinx14_2/mb_ref_guide.pdf.

Part 4 of 6—"MicroBlaze Processor Reference Guide", Retrieved on: Feb. 26, 2015, pp. 117-157 Available at: http://www.xilinx.com/support/documentation/sw_manuals/xilinx14_2/mb_ref_guide.pdf.

Part 5 of 6—"MicroBlaze Processor Reference Guide", Retrieved on: Feb. 26, 2015, pp. 158-198 Available at: http://www.xilinx.com/support/documentation/sw_manuals/xilinx14_2/mb_ref_guide.pdf.

Part 6 of 6—"MicroBlaze Processor Reference Guide", Retrieved on: Feb. 26, 2015, pp. 199-256 Available at: http://www.xilinx.com/support/documentation/sw_manuals/xilinx14_2/mb_ref_guide.pdf.

"International Search Report & Written Opinion Received for PCT Application No. PCT/US2016/026293", dated Jun. 20, 2016, 10 Pages.

"International Preliminary Report on Patentability Issued in PCT Application No. PCT/US2016/026293", dated Mar. 13, 2017, 8 Pages.

* cited by examiner

LOCALLY RESTORING FUNCTIONALITY AT ACCELERATION COMPONENTS

CROSS-REFERENCE TO RELATED APPLICATIONS

This application claims the benefit of U.S. Provisional Patent Application Ser. No. 62/149,305, entitled "Restoring Service Functionality At Acceleration Components", filed Apr. 17, 2015 which is incorporated herein in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

BRIEF SUMMARY

Examples extend to methods, systems, and computer program products for locally restoring functionality at acceleration components. An error is detected in a role at the acceleration component. The error is detected by comparing actual behavior of the role to defined legitimate behavior for the role. The acceleration component is included in a group of interoperating acceleration components in a hardware acceleration plane. Roles at each acceleration component in the group of interoperating acceleration components are linked together to compose a graph that provides service acceleration for a service.

Input to the role is paused. A reset command is locally sent to the role within the acceleration component. An acknowledgement is received from the role indicating that the role was successfully restarted. Input to the role is enabled in response to receiving the acknowledgment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
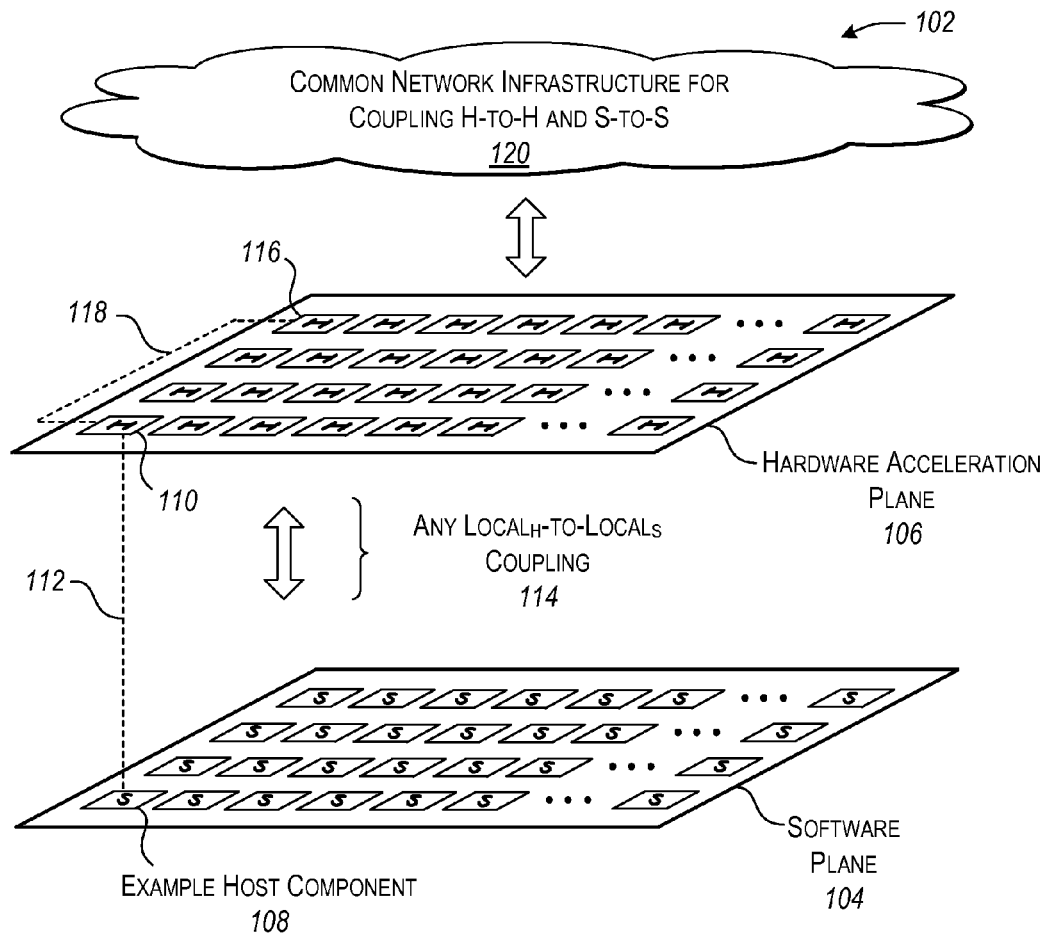
FIG. 1 illustrates an example architecture that includes a software plane and a hardware acceleration plane.

Examples to methods, systems, and computer program products for locally restoring functionality at acceleration components. An error is detected in a role at the acceleration component. The error is detected by comparing actual behavior of the role to defined legitimate behavior for the role. The acceleration component is included in a group of interoperating acceleration components in a hardware acceleration plane. Roles at each acceleration component in the group of interoperating acceleration components are linked together to compose a graph that provides service acceleration for a service.

Input to the role is paused. A reset command is locally sent to the role within the acceleration component. An acknowledgement is received from the role indicating that the role was successfully restarted. Input to the role is enabled in response to receiving the acknowledgment.

In one aspect, prior to receiving the acknowledgment, it is determined that the reset failed to address the detected error (e.g., the acknowledgement is not received within a specified time period). An image file is reloaded at the acceleration component to restore the role. The image file can be reloaded in response to an instruction from an external component, such as, for example, a locally linked host component or a management service. It is determined that the image file was successfully loaded at the acceleration component to restore the role.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the following claims, an "acceleration component" is defined as a hardware component specialized (configured, possibly through programming) to perform a computing function more efficiently than software running on general-purpose central processing unit (CPU) could perform the computing function. Acceleration components include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

In this description and in the following claims, a "role" is defined as functionality provided by an acceleration component to a group of interoperating acceleration components used to accelerate a service. Roles at each acceleration component in a group of interoperating acceleration components can be linked together to compose a graph that provides the service acceleration.

In this description and in the following claims, a "graph" is defined as a group of interconnected (e.g., network connected) acceleration components providing acceleration for a service wherein each acceleration component in the group provides a portion of the acceleration functionality.

In this description an in the following claims, an "image" is defined as a file including information that can be used in configuration of an acceleration component, such as, for example, an FPGA. Information included in an image file can be used to program hardware components of an acceleration component (e.g., logic blocks and reconfigurable interconnects of an FPGA) to implement desired functionality. Desired functionality can be implemented to solve virtually any problem which is computable.

In this description and in the following claims, a "neighbor acceleration component" is defined as an acceleration component configured to exchange input and/or output with another acceleration component when interconnected to the other acceleration component within a graph. Neighbor is viewed logically from the perspective of the graph. The physical proximity of an acceleration component relative to another acceleration component is not a determining factor in identifying neighbor acceleration components. That is, acceleration components that are not physically adjacent to one another (or even near to one another on a network or within a datacenter) can be configured to exchange data with one another when interconnected within a graph. Acceleration components interconnected within a graph can be viewed as neighbor acceleration components even if data exchanged between the acceleration components physically passes through other acceleration components outside of the graph or through host components in transit between the acceleration components. However, acceleration components that are physically adjacent or near to one another on a network or in a datacenter and are interconnected within a graph can also be viewed as neighbor acceleration components with respect to one another.

In general, an acceleration component can include an array of programmable logic blocks and hierarchy of reconfigurable interconnects that allow logic blocks to be connected together in different configurations to provide different functionality (i.e., different roles). Image files can be received and loaded at an acceleration component to configure programmable logic blocks and configure interconnects to provide desired functionality (i.e., roles).

In some environments, applications (services) are provided to a client from a data center. A data center includes multiple (and potentially a very large number of) software-driven general purpose computing devices. Each general purpose computing device can include one or more central processing units (CPUs) that process machine-readable instructions to perform specified computing activities. The multiple general purpose computing devices are networked to one another such that the combined power of the multiple general purpose computer systems (or subsets thereof) can be used to perform more complex computing activities.

Data center providers face continuing challenges to increase processing capabilities and efficiency within and provided by data centers. Continuing to add more and more general purpose computing devices is not feasible due at least in part to power limitations. Computing device specialization is one option. For example, computing devices can be specialized for specific scale workloads to provide some efficiency gains. However, computing device specialization is problematic for at least two reasons. First, lack of homogeneity in a data center increases management issues and provides inconsistent platforms for applications to rely on. Further, data center services evolve rapidly, making non-programmable hardware features impractical. Thus, data center providers need continued improvements in performance and efficiency but cannot obtain those improvements from general purpose computing devices.

Aspects facilitate locally restoring a role at an acceleration component when an error is self-detected at the acceleration component (e.g., by local monitoring logic). Locally restoring a role can include resetting internal state (application logic) of the acceleration component providing the role. At the acceleration component, handling of incoming data can be paused, the role reset, and handling of incoming data then resumed. Self-detection of errors and local restoration of a role is less resource intensive and more efficient than using external components (e.g., high-level services) to restore functionality at an acceleration component and/or to reset an entire graph.

Monitoring logic at an acceleration component can locally monitor the acceleration component for errors in a role. An error in a role at one acceleration component can propagate to other components causing a graph to exhibit incorrect behaviors. To detect errors, the monitoring logic compares actual behavior of the role against defined legitimate behavior for the role. The monitoring logic can take local action to restore the defined legitimate behavior for the role (and thus potentially also restore the service), while minimizing impact on other acceleration components and other components.

In one aspect, each acceleration component in a group of interoperating acceleration components includes local monitoring logic. Local monitoring logical at a plurality of the acceleration components (in the group of interoperating acceleration components) take local action in parallel to restore defined legitimate behavior for corresponding roles. Thus, even if errors occur at multiple acceleration components, the errors may be locally correctable to restore a graph without involvement of external components (e.g., a locally linked host component or a high-level software service).

In another aspect, a service manager (a higher-level software service) has a global view of a plurality of acceleration components, including the group of interoperating acceleration components as well as one or more other acceleration components. Roles at each acceleration component in the group of interoperating acceleration components are linked to compose a graph that provides service acceleration for a service. The service manager can monitor roles at each acceleration component for errors. As such, the service manager has knowledge of the graph and of roles at other acceleration components that are not available locally at the acceleration components. The service manager can use the knowledge to restore legitimate behavior for a graph and one or more roles.

Thus, the service manager can detect an error in a role at an acceleration component. In response, the service manager can contact a locally linked host component or a module within the acceleration component to attempt to reset the role. Although the error is detected by the service manager (an external component), restoration is performed locally. Locally restoring a role is less resource intensive and more efficient than having the service manager restore the role.

When local restoration fails, the service manager can attempt to restore the role, such as, for example, by moving the role to another acceleration component, by reloading an image for the role at the acceleration component, etc.

In some aspects, an acceleration component is locally linked to a host component (e.g., a CPU), such as, for example, when the acceleration component and host component are included in the same server. In these aspects, the host component may detect an error in a role at the locally linked acceleration component. The host component can instruct the acceleration component to locally restore the role. When local restoration fails, the host component can attempt to restore the role (e.g., reloading an image for the role at the acceleration component) without involving external components (e.g., a higher-level software service). A host component restoring a role at a locally linked acceleration component can be less resource intensive (at least with respect to network bandwidth resources) and more efficient than having external components (e.g., a higher-level software service) restore the role. When restoration by a locally linked host component fails, external components (e.g., a higher-level software service, such as, a service manager) can attempt to restore the role.

Additionally, when an acceleration component local detects an error with a role, the acceleration component may expressly request that a locally linked host component and/or external components (e.g., a higher-level software service, such as, a service manager) attempt restore the role (e.g., when local restoration fails). An express request for a role restoration may notify the locally linked host component or external components about the error before the error would otherwise be detected.

Accordingly, aspects can be used to: (a) locally monitor acceleration components for errors in a role, (b) locally recover a role at an acceleration component, and (c) locally address errors at multiple acceleration components in parallel.

Aspects can use a performance handling algorithm that can reconfigure an acceleration component or remap roles (functionality) robustly, recover from degraded performance and failures by remapping roles (functionality) between acceleration components, and report errors to management software to diagnose problems.

In general, a data center deployment includes a hardware acceleration plane and a software plane. The hardware acceleration plane can include a plurality of networked acceleration components (e.g., FPGAs). The software plane can include a plurality of networked software-implemented host components (e.g., central processing units (CPUs)). A network infrastructure can be shared between the hardware acceleration plane and the software plane. In some environments, software-implemented host components are locally linked to corresponding acceleration components.

FIG. 1 illustrates an example architecture 102 that includes a software plane 104 and a hardware acceleration plane 106. The software plane 104 includes a collection of software-driven components (each denoted by the symbol "S") while the hardware plane includes a collection of hardware acceleration components (each denoted by the symbol "H"). For example, each host component may correspond to a server computer that executes machine-readable instructions using one or more central processing units (CPUs). Each CPU, in turn, may execute the instructions on one or more hardware threads. Each acceleration component can execute hardware logic for implementing functions, such as, for example, portions of services offer by a data center.

Hardware acceleration plane 106 can be constructed using a heterogeneous collection of acceleration components, including different types of acceleration components and/or the same type of acceleration components with different capabilities. For example, hardware acceleration plane 106 can include FPGA devices having different respective processing capabilities and architectures, a mixture of FPGA devices and other devices, and so on. Hardware acceleration plane 106 provides a reconfigurable fabric of acceleration components.

A host component generally performs operations using a temporal execution paradigm (i.e., sequentially) by using each of its CPU hardware threads to execute machine-readable instructions, one after the after. In contrast, an acceleration component may perform operations using a spatial paradigm (i.e., concurrently) by using a large number of parallel logic elements to perform computational tasks. Thus, an acceleration component can perform some operations in less time compared to a software-driven host component. In the context of the architecture 102, the "acceleration" qualifier associated with the term "acceleration component" reflects its potential for accelerating the functions that are performed by the host components.

In one example, architecture 102 corresponds to a data center environment that includes a plurality of computer servers. The computer servers correspond to the host components in the software plane 104. In another example, architecture 102 corresponds to an enterprise system. In a further example, the architecture 102 corresponds to a user device or appliance which uses at least one host component that has access to two or more acceleration components, etc. Other implementations for architecture 102 are also possible.

Common network infrastructure 120 couples host components in the software plane 104 to other host components and couples acceleration components in the hardware acceleration plane 106 to other acceleration components. That is, host components can use common network infrastructure 120 to interact with one another and acceleration components can use common network infrastructure 120 to interact with one another. Interaction among host components in the software plane 104 is independent of the interaction among acceleration components in the hardware acceleration plane 106. As such, two or more acceleration components may communicate in a transparent manner relative to host components in the software plane 104, outside the direction of the host components, and without the host components being "aware" of particular interaction is even taking place in the hardware acceleration plane 106.

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to the acceleration plane 106 can be distinguished from packets belonging to the software plane 104 based on the value of a status flag in each of the packets.

As such, architecture 102 can be viewed as two logical networks (software plane 104 and hardware acceleration plane 106) that share the same physical network communication links. Packets associated with the two logical networks may be distinguished from each other by their respective traffic classes In another aspect, each host component in the architecture 102 is coupled to at least one acceleration component in hardware acceleration plane 104 through a local link. For example, a host component and acceleration component can be arranged together and maintained as single serviceable unit (e.g., a server) within architecture 102. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 102, host component 108 is coupled to acceleration component 110 through a local link 112 (e.g., a Peripheral Component Interconnect Express (PCIe) link). Thus, host component 108 is a local host component form the perspective of acceleration component 110 and acceleration component 110 is a local acceleration component from the perspective of host component 108. The local linking of host component 108 and acceleration component 110 can form part of a server. More generally, host components in software plane 104 can be locally coupled to acceleration components in hardware acceleration plane 106 through many individual links collectively represented as a local$_H$-to-local$_S$ coupling 114.

Thus, a host component can interact directly with any locally linked acceleration components. As such, a host component can initiate communication to a locally linked acceleration component to cause further communication among multiple acceleration components. For example, a host component can issue a request for a service (or portion thereof) where functionality for the service (or portion thereof) is composed across a group of one or more acceleration components in hardware acceleration plane 106.

Thus, a host component can also interact indirectly with other acceleration components in hardware acceleration plane 106 to which the host component is not locally linked. For example, host component 108 can indirectly communicate with acceleration component 116 via acceleration component 110. More specifically, acceleration component 110 communicates with acceleration component 116 via a link 118 (e.g., network infrastructure 120).

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server unit component can determine whether an incoming packet is destined for the local host component as opposed to the local acceleration component in different ways. For example, packets that are destined for the local acceleration component can be formulated as UDP packets having a specific port; host-defined packets, on the other hand, are not formulated in this way. In another case, packets belonging to hardware acceleration plane 106 can be distinguished from packets belonging to the software plane 104 based on the value of a status flag in each of the packets.

The acceleration components in hardware acceleration plane 106 can be used to accelerate larger-scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different roles at different times.

Figure 2:
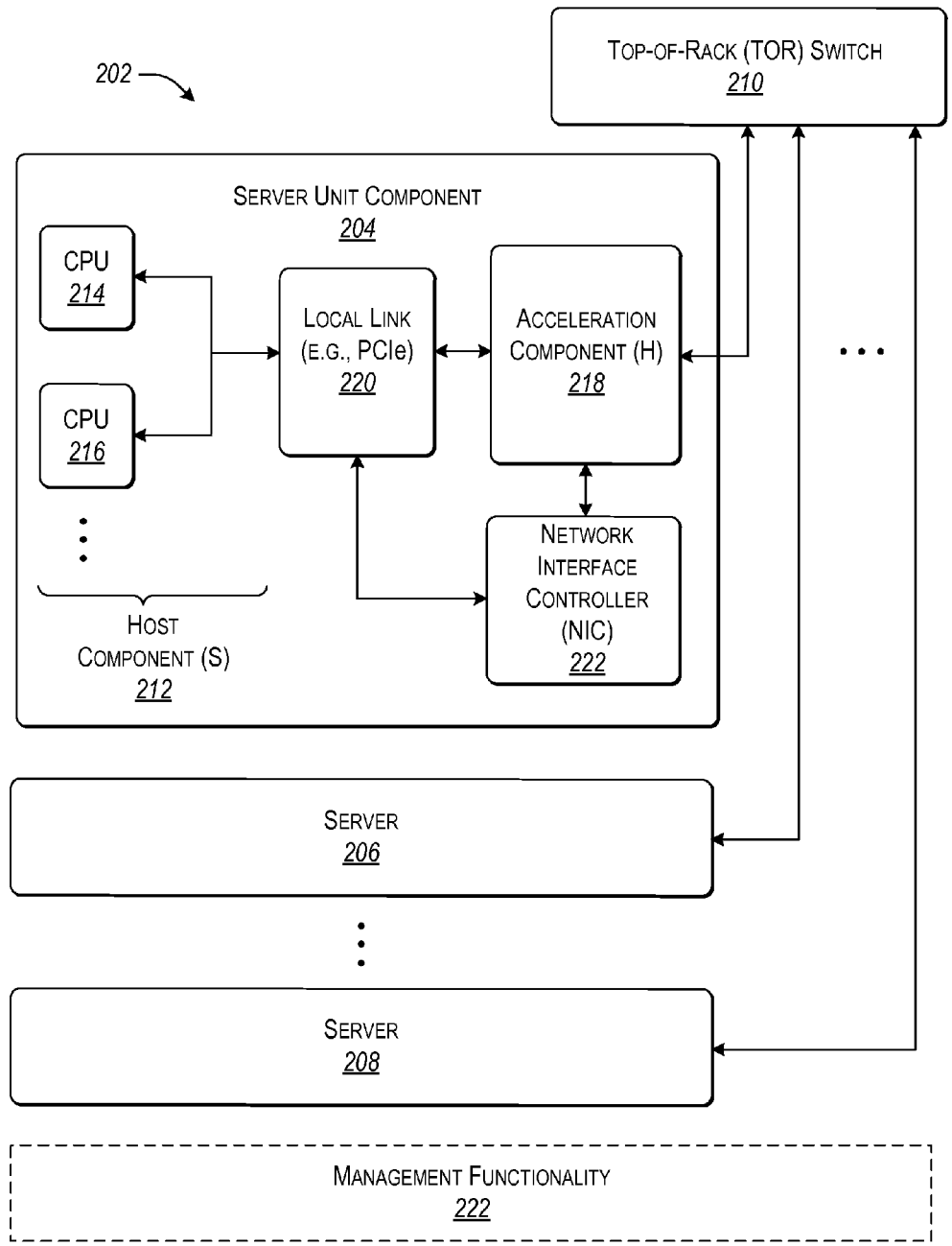
FIG. 2 illustrates an example architecture, including servers, that can be used in a data center

FIG. 2 illustrates an example architecture 202 that can be used in a data center. Servers 204, 206, and 208 can be included in a rack in the data center. Each of servers 204, 206, and 208 can be coupled to top-of-rack (TOR) switch 410. Other racks, although not shown, may have a similar configuration. Server 204 further includes host component 212 including CPUs 214, 216, etc. Host component 212 along with host components from servers 206 and 208 can be included in software plane 104. Server 204 also includes acceleration component 218. Acceleration component 218 along with acceleration components from servers 206 and 208 can be included in hardware acceleration plane 106.

Acceleration component 218 is directly coupled to host component 212 via local link 220 (e.g., a PCIe link). Thus, host component 212 can view acceleration component 218 as a local acceleration component and acceleration component 218 can view host component 212 as a local host component. Acceleration component 218 and host component 212 are also indirectly coupled by way of network interface controller 422 (e.g., used to communicate across network infrastructure 120). Server 204 can load images representing a role onto acceleration component 218.

Acceleration component 218 is also coupled to TOR switch 210. Hence, in architecture 202, acceleration component 218 represents the path through which host component 212 interacts with other components in the data center (including other host components and other acceleration components). Architecture 202 allows acceleration component 218 to perform processing on packets that are received from (and/or sent to) TOR switch 410 (e.g., by performing encryption, compression, etc.), without burdening the CPU-based operations performed by host component 412.

Management functionality 222 serves to manage the operations of architecture 202. Management functionality 222 can be physically implemented using different control architectures. For example, in one control architecture, the management functionality 222 may include plural local management components that are coupled to one or more global management components.

Figure 3:
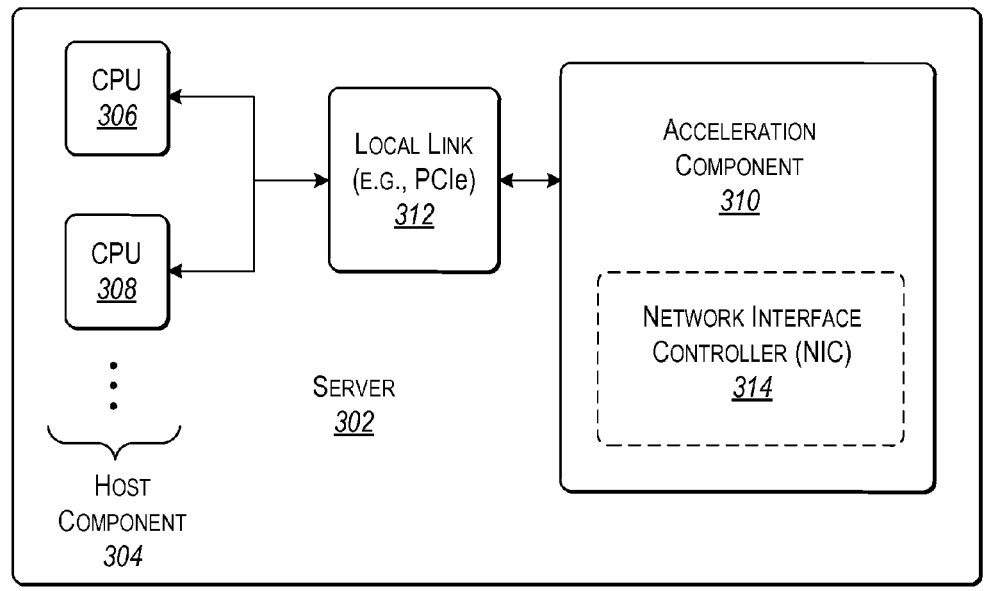
FIG. 3 illustrates an example server.

FIG. 3 illustrates an example server 302. Server 302 includes host component 304 including CPUs 606, 608, etc., acceleration component 310, and local link 312. Acceleration component 310 is directly coupled to host component 304 via local link 312 (e.g., a PCIe link). Thus, host component 304 can view acceleration component 310 as a local acceleration component and acceleration component 310 can view host component 304 as a local host component. Host component 304 and acceleration component 310 can be included in software plane 104 and hardware acceleration plane 106 respectively. Server 302 implements network interface controller (NIC) 314 as an internal component of acceleration component 310. Server 302 can load images representing a role onto acceleration component 310.

Figure 4:
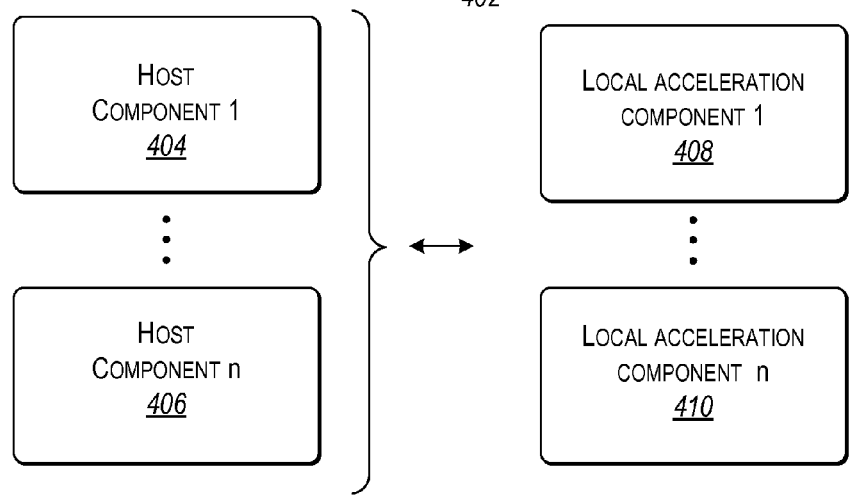
FIG. 4 illustrates an example server.

FIG. 4 illustrates an example server 402. Server 402 includes host components 404 through 406 including any number n of host components. Host components 404 through 406 can be included in software plane 104. Server 402 includes acceleration components 408 through 410 including any number m of acceleration components. Acceleration components 408 through 410 can be included in hardware acceleration plane 106. Server 402 can also include a network interface controller (not shown).

Server 402 can include a single host component locally linked to two acceleration components. The two acceleration components can perform different respective tasks. For example, one acceleration component can be used to process outgoing traffic to its local TOR switch, while the other acceleration component can be used to process incoming traffic from the TOR switch. In addition, server 402 can load images representing a role onto any of the acceleration components 408 through 410.

In general, a service (e.g., search ranking, encryption, compression, computer vision, speech translation, etc.) can be implemented at one or more host components, at one or more acceleration components, or a combination of one or more host components and one or more acceleration components depending on what components are better suited to provide different portions of the service.

Figure 5:
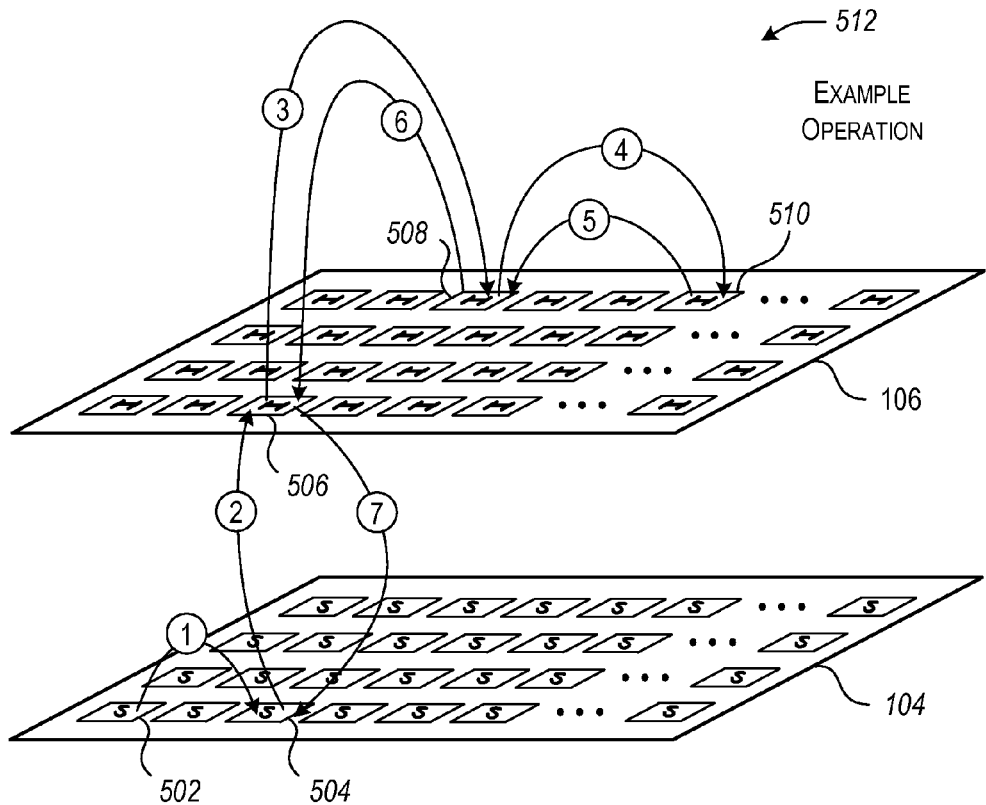
FIG. 5 illustrates an example service implemented using components of a software plane and components of a hardware acceleration plane.

FIG. 5 illustrates an example service 512 implemented using components of software plane 104 and components of hardware acceleration plane 106. In operation (1), host component 502 communicates with host component 504 in the course of performing a computational task. In operation (2) host component 504 then requests the use of service 512 that is implemented in the hardware acceleration plane 106 (although host component 504 may not be "aware" of where service 512 is implemented) by communicating with acceleration component 506 over a local link.

The requested service 512 is a composed service spread out over a plurality of acceleration components, each of which performs a specified portion of the service. Although acceleration component 506 was contacted to request use of the service 512, acceleration component 506 may not be the head of the composed service (or even be part of the multi-component service). Instead, acceleration component 508 may be the head component for the composed service.

As such, in operation (3), host component 504 indirectly communicates with acceleration component 508 via acceleration component 506. Acceleration component 508 then performs its portion of the composed service to generate an intermediate output result. In operation (4), acceleration component 508 then invokes acceleration component 510, which performs another respective portion of the composed service, to generate a final result. In operations (5), (6), and (7), the hardware acceleration plane 106 successively forwards the final result back to the requesting host component 504, through the same chain of components set forth above but in the opposite direction.

Operations in hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

The hardware acceleration plane 106 operates in a manner that is transparent to a requesting host component. For example, host component 504 may be "unaware" of how its request is being processed in hardware acceleration plane 106, including the fact that the service corresponds to a composed service.

Communication in software plane 104 (e.g., corresponding to operation (1)) can take place using the same common network infrastructure 120 as communication in the hardware acceleration plane 106 (e.g., correspond to operations (3)-(6)). Operations (2) and (7) may take place over a local link, corresponding to the locak$_H$-to-local$_S$ coupling 114 shown in FIG. 1.

Figure 6:
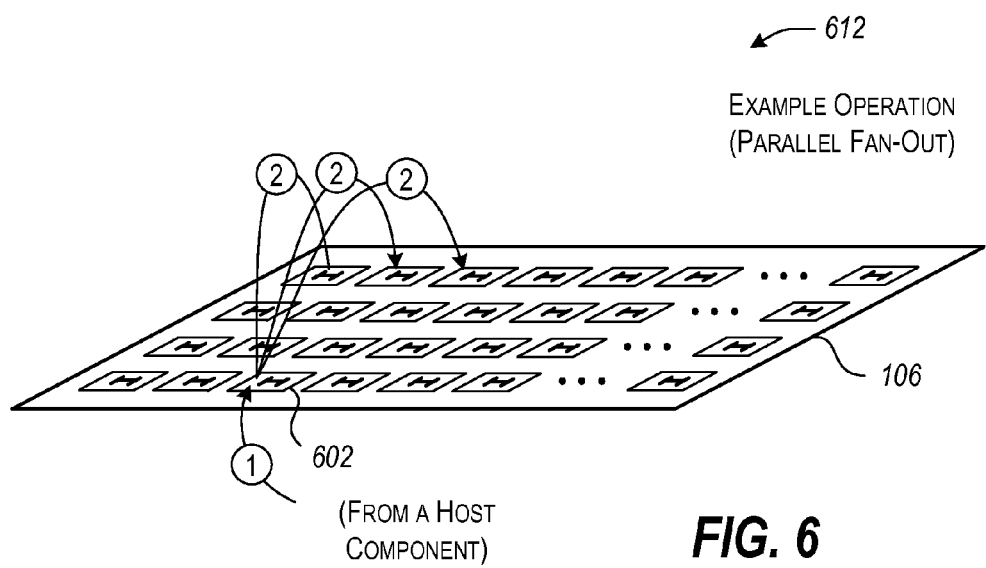
FIG. 6 illustrates an example service implemented using components of a software plane and components of a hardware acceleration plane.

FIG. 6 illustrates an example service 612 implemented using components of a software plane and components of hardware acceleration plane 106 Service 612 uses a different flow structure than service 512. More specifically, in operation (1), a host component (not shown) sends a request to its local acceleration component 602. In this example, local acceleration component 602 is also the head component of service 612. In operation (2), local acceleration component 602 may then forward one or more messages to a plurality of respective acceleration components. Each acceleration component that receives a message may perform a portion of a composed service in parallel with the other acceleration components. (FIG. 6 may represent only a portion of service 612, other portions of service 612 can be implemented at other hardware accelerators).

In general, an acceleration component can include any of variety of components some of which can be more or less common across different application images. Some components, such as, for example, a role, are distinct between application images. Other components, such as, for example, routers, transport components, switches, diagnostic recorders, etc., can be relatively common between some number of application images. These other relatively common components can be viewed as being included in an intermediate layer of abstraction or "soft shell". Further components, such as, for example, bridges, bypass controls, Network Interface Cards, Top of Rack Interfaces, buffers, memory controllers, PCIe controllers, Inter-FPGA network controllers, configuration memories and interfaces, host interfaces, debugging and back-channel interfaces (e.g., Joint Test Action Group (JTAG) interfaces, Inter-Integrated Circuit (I2C) interfaces, etc.), sensors, etc. can be very common between a higher number of (and essentially all) application images. These further very common components can be viewed as included in a greater layer of abstraction (e.g., than the other relatively common components) or "shell".

When an FPGA is reconfigured with new functionality, it is likely (although not guaranteed) that a role (i.e., the application-specific logic) at the FGPA is changed. However, it is unlikely that existing functionality in the soft shell is changed and it is extremely unlikely that existing functionality in the soft shell is changed. Thus, components in the soft shell and to greater extent components in the shell provide a common interface for a role. As such, the shell allows code for a role to be ported relatively easy across different acceleration components.

Figure 7:
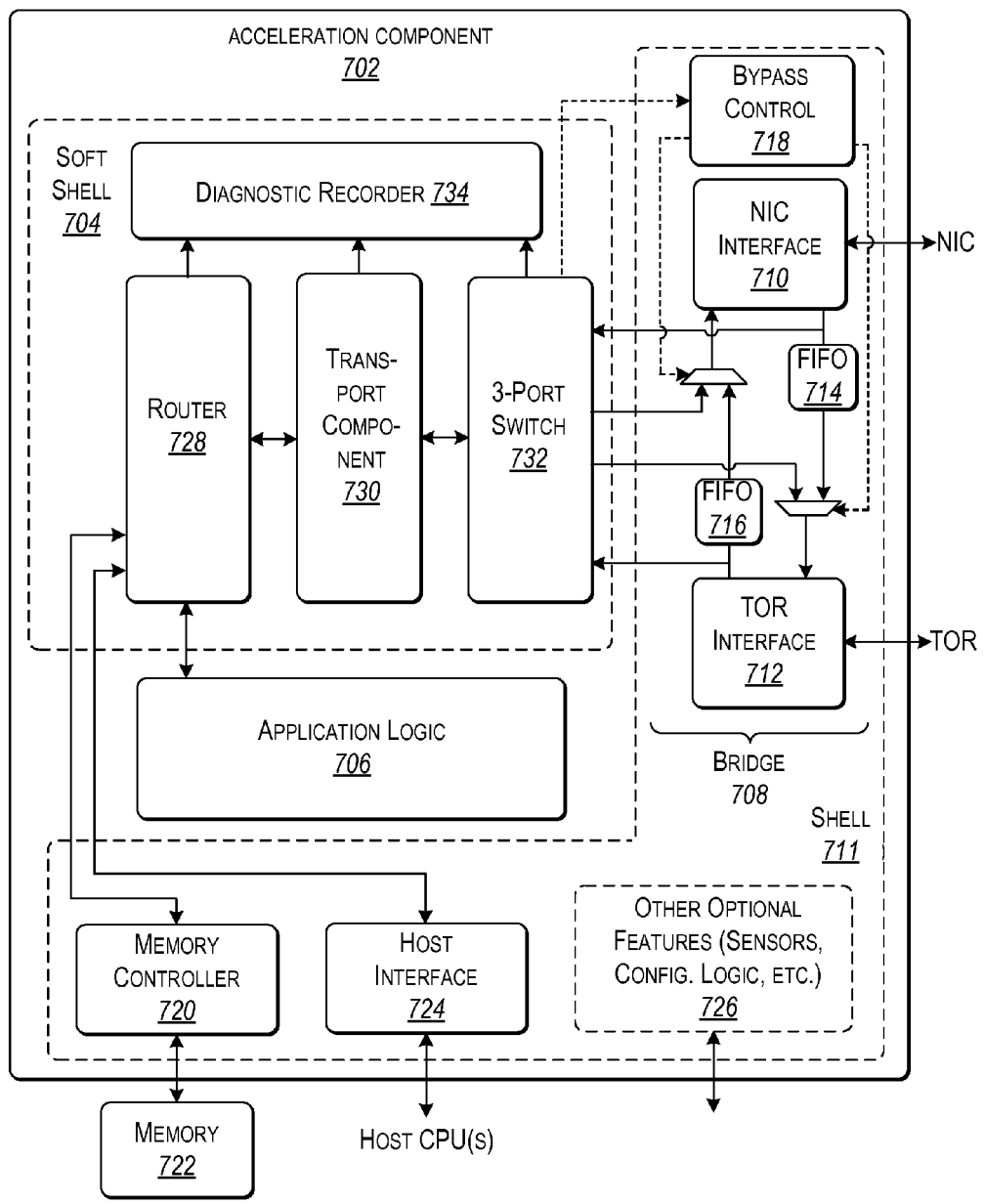
FIG. 7 illustrates an example architecture of an acceleration component.

Turning to FIG. 7, FIG. 7 illustrates an example architecture of an acceleration component 702. Acceleration component 702 can be included in hardware acceleration plane 106. Components included in acceleration component 702 can be implemented on hardware resources (e.g., logic blocks and programmable interconnects) of acceleration component 702.

Acceleration component 702 includes application logic 706, soft shell 704 associated with a first set of resources and shell 711 associated with a second set of resources. The resources associated with shell 711 correspond to lower-level interface-related components that generally remain the same across many different application scenarios. The resources associated with soft shell 704 can remain the same across at least some different application scenarios. Application logic 706 may be further conceptualized as including an application domain (e.g., a "role"). The application domain or role can represent a portion of functionality included in a composed service spread out over a plurality of acceleration components.

The application domain hosts application logic 706 that performs service specific tasks (such as a portion of functionality for ranking documents, encrypting data, compressing data, facilitating computer vision, facilitating speech translation, machine learning, etc.). Resources associated with soft shell 704 are generally less subject to change compared to the application resources, and the resources associated with shell 711 are less subject to change compared to the resources associated with soft shell 704 (although it is possible to change (reconfigure) any component of acceleration component 702).

In operation, application logic 706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to the shell 711, shell resources include bridge 708 for coupling acceleration component 702 to the network interface controller (via a NIC interface 710) and a local top-of-rack switch (via a TOR interface 712). Bridge 708 also includes a data path that allows traffic from the NIC or TOR to flow into acceleration component 702, and traffic from the acceleration component 702 to flow out to the NIC or TOR. Internally, bridge 708 may be composed of various FIFOs (714, 716) which buffer received packets, and various selectors and arbitration logic which route packets to their desired destinations. A bypass control component 718, when activated, can control bridge 708 so that packets are transmitted between the NIC and TOR without further processing by the acceleration component 702.

Memory controller 720 governs interaction between the acceleration component 702 and local memory 722 (such as DRAM memory). The memory controller 720 may perform error correction as part of its services.

Host interface 724 provides functionality that enables acceleration component 702 to interact with a local host component (not shown). In one implementation, the host interface 724 may use Peripheral Component Interconnect Express (PCIe), in conjunction with direct memory access (DMA), to exchange information with the local host component. The outer shell may also include various other features 726, such as clock signal generators, status LEDs, error correction functionality, and so on.

Turning to soft shell 704, router 728 is for routing messages between various internal components of the acceleration component 702, and between the acceleration component and external entities (e.g., via a transport component 730). Each such endpoint is associated with a respective port. For example, router 728 is coupled to memory controller 720, host interface 724, application logic 706, and transport component 730.

Transport component 730 formulates packets for transmission to remote entities (such as other acceleration components), and receives packets from the remote entities (such as other acceleration components). A 3-port switch 732, when activated, takes over the function of the bridge 708 by routing packets between the NIC and TOR, and between the NIC or TOR and a local port associated with the acceleration component 702.

Diagnostic recorder 734 can store information regarding operations performed by the router 728, transport component 730, and 3-port switch 732 in a circular buffer. For example, the information may include data about a packet's origin and destination IP addresses, host-specific data, timestamps, etc. A technician may study a log of the information in an attempt to diagnose causes of failure or sub-optimal performance in the acceleration component 702.

A plurality of acceleration components similar to acceleration component 702 can be included in hardware acceleration plane 106.

Acceleration components can use different network topologies (instead of using common network infrastructure 120 for communication) to communicate with one another. In one aspect, acceleration components are connected directly to one another, such as, for example, in a two dimensional torus.

Figure 8:
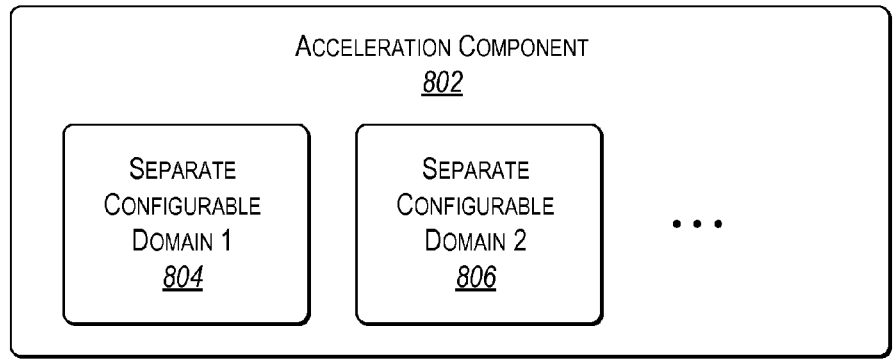
FIG. 8 illustrates an acceleration component including separate configurable domains.

FIG. 8 illustrates an acceleration component 802 including separate configurable domains 804, 805, etc. A configuration component (not shown) can configure each configurable domain without affecting other configurable domains. Hence, the configuration component can configure one or more configurable domains while the other configurable domains are executing operations based on their respective configurations, which are not disturbed.

Figure 9:
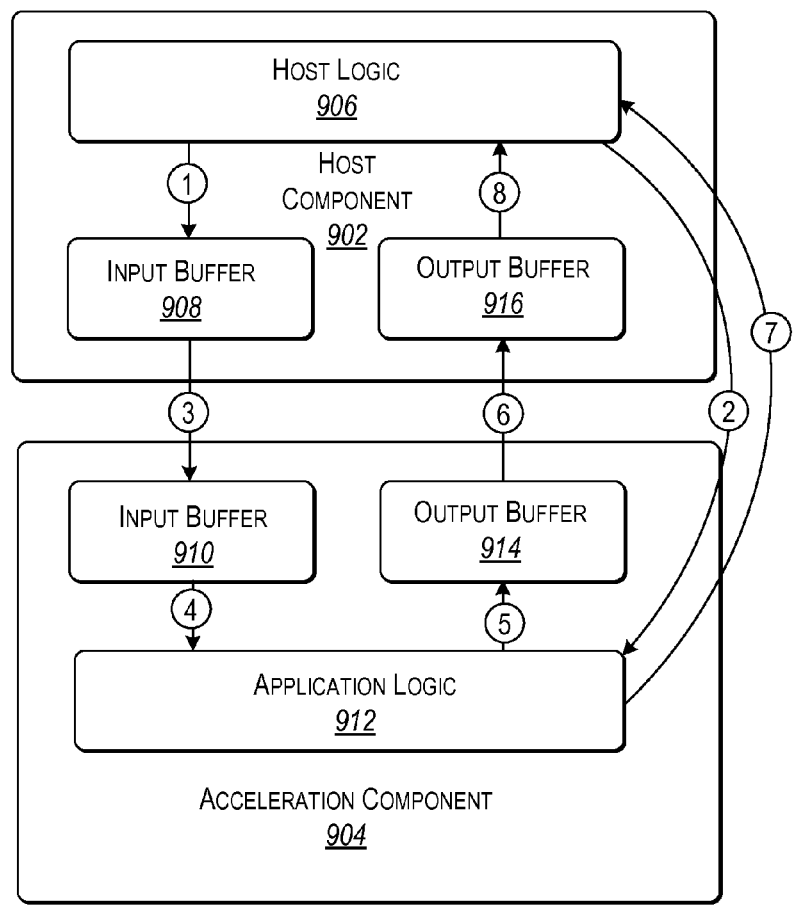
FIG. 9 illustrates functionality for performing data transfer between a local host component and an associated local hardware acceleration component.

FIG. 9 illustrates functionality for performing data transfer between a host component 902 and an associated acceleration component 904. Data can be transferred via a host interface (e.g., host interface 724), for example, using PCIe in conjunction with DMA memory transfer). In operation (1), host logic 926 places data to be processed into kernel-pinned input buffer 908 in main memory associated with the host logic 906. In operation (2), the host logic 906 instructs the acceleration component 904 to retrieve the data and begin processing it. The host logic's thread is then either put to sleep until it receives a notification event from the acceleration component 904, or it continues processing other data asynchronously. In operation (3), the acceleration component 904 transfers the data from the host logic's memory and places it in an acceleration component input buffer 910.

In operations (4) and (5), the application logic 912 retrieves the data from the input buffer 910, processes it to generate an output result, and places the output result in an output buffer 914. In operation (6), the acceleration component 904 copies the contents of the output buffer 914 into an output buffer in the host logic's memory. In operation (7), acceleration component 904 notifies the host logic 906 that the data is ready for it to retrieve. In operation (8), the host logic thread wakes up and consumes the data in the output buffer 916. The host logic 906 may then discard the contents of the output buffer 916, which allows the acceleration component 904 to reuse it in the next loading operation.

Figure 10:
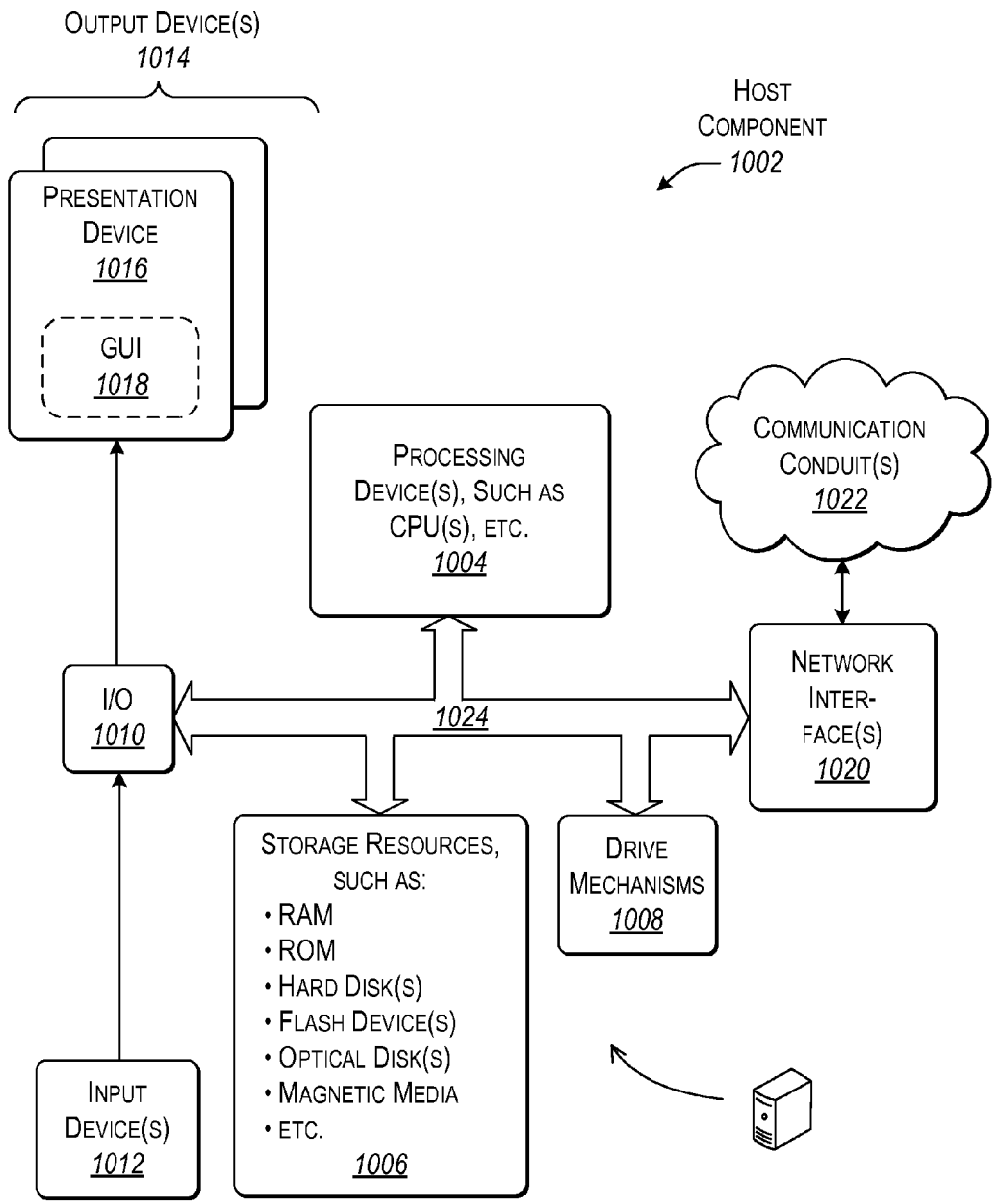
FIG. 10 illustrates an example architecture of a host component.

FIG. 10 illustrates an example architecture of a host component 1002. Host component 1002 can include one or more processing devices 1004, such as one or more central processing units (CPUs). The host component 1002 can also include any storage resources 1006 for storing any kind of information, such as code, settings, data, etc. Without limitation, for instance, the storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the host component 1002. In one case, the host component 1002 may perform any of the operations associated with local tenant functionality when the processing devices 1004 carry out associated instructions stored in any storage resource or combination of storage resources. The host component 1002 also includes one or more drive mechanisms 1008 for interacting with any storage resource, such as a hard disk drive mechanism, an optical disk drive mechanism, and so on.

As to terminology, any of the storage resources described herein, or any combination of the storage resources, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable storage device" expressly exclude propagated signals per se, while including all other forms of computer readable media.

The host component 1002 also includes an input/output module 1010 for receiving various inputs (via input devices 1012), and for providing various outputs (via output devices 1014). One particular output mechanism may include a presentation device 1016 and an associated graphical user interface (GUI) 1018. The host component 1002 can also include one or more network interfaces 1020 for exchanging data with other devices via one or more communication conduits 1022. One or more communication buses 1024 communicatively couple the above-described components together.

The communication conduit(s) 1022 can be implemented in any manner, e.g., by a local area network, a wide area network (e.g., the Internet), point-to-point connections, etc., or any combination thereof. The communication conduit(s) 1022 can include any combination of hardwired links, wireless links, routers, gateway functionality, name servers, etc., governed by any protocol or combination of protocols.

A plurality of host components similar to host component 1002 can be included in software plane 104.

Figure 11:
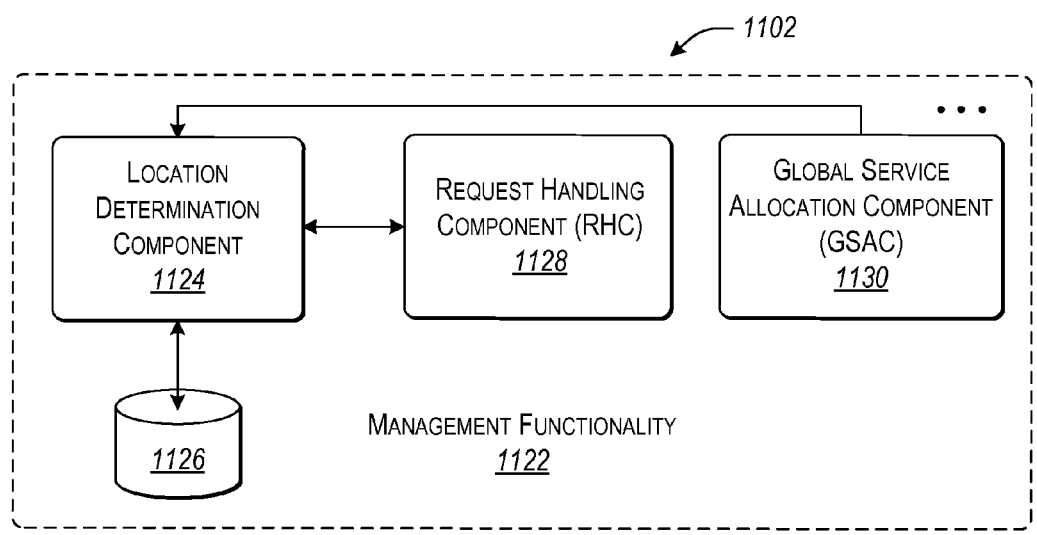
FIG. 11 illustrates an example architecture of management functionality for managing services in a data center.

FIG. 11 illustrates an example architecture 1102 of management functionality 1122 for managing services in a data center. Architecture 1102 can be included in architecture 102. As such, management functionality 1122 as well as other associated components can be implemented on hardware resources of a host component (e.g., in software plane 104) and/or implemented on hardware resources of an acceleration component (e.g., in hardware acceleration plane 106). Host component hardware resources can include any of the hardware resources associated with host component 1002. Acceleration component hardware resources can include any of the hardware resources associated with acceleration component 702.

Management functionality 122 can include a number of sub-components that perform different respective functions (which can be physically implemented in different ways). A local determination component 1124, for example, can identify the current locations of services within architecture 102, based on information stored in a data store 1126. In operation, location determination component 1124 may receive a request for a service. In response, location determination component 1124 returns an address associated with the service, if that address is present in the data store 1126. The address may identify a particular acceleration component in hardware acceleration plane 106 that hosts (or is the head of) the requested service.

Request handling component (RHC) 1128 processes requests for services made by instances of tenant functionality. For example, an instance of tenant functionality may correspond to a software program running on a particular local host component. That software program may request a service in the course of its execution. The RHC 1128 handles the request by determining an appropriate component in architecture 102 to provide the service. Possible components for consideration include: a local acceleration component (associated with the local host component from which the request originated); a remote acceleration component; and/or the local host component itself (whereupon the local host component implements the service in software). RHC 1128 makes its determinations based on one or more request handling considerations, such as whether the requested service pertains to a line-rate service. Further, the RHC 1128 may interact with the location determination component 1124 in performing its functions.

A global service allocation component (GSAC) 1130 can operate in a background and global mode, allocating services to acceleration components based on global conditions in architecture 102 (rather than handling individual requests from instances of tenant functionality, as does RHC 1128). For example, GSAC 1130 may invoke its allocation function in response to a change in demand that affects one or more services. GSAC 1130 makes its determinations based on one or more allocation considerations, such as the historical demand associated with the services, etc. Further, the GSAC 130 may interact with the location determination component 1124 in performing its functions. A sub-component of GSAC 1130 can also manage multi-component and/or composed services. A multi-component service is a service that is composed of plural parts. Plural respective acceleration components perform the respective parts.

Figure 12:
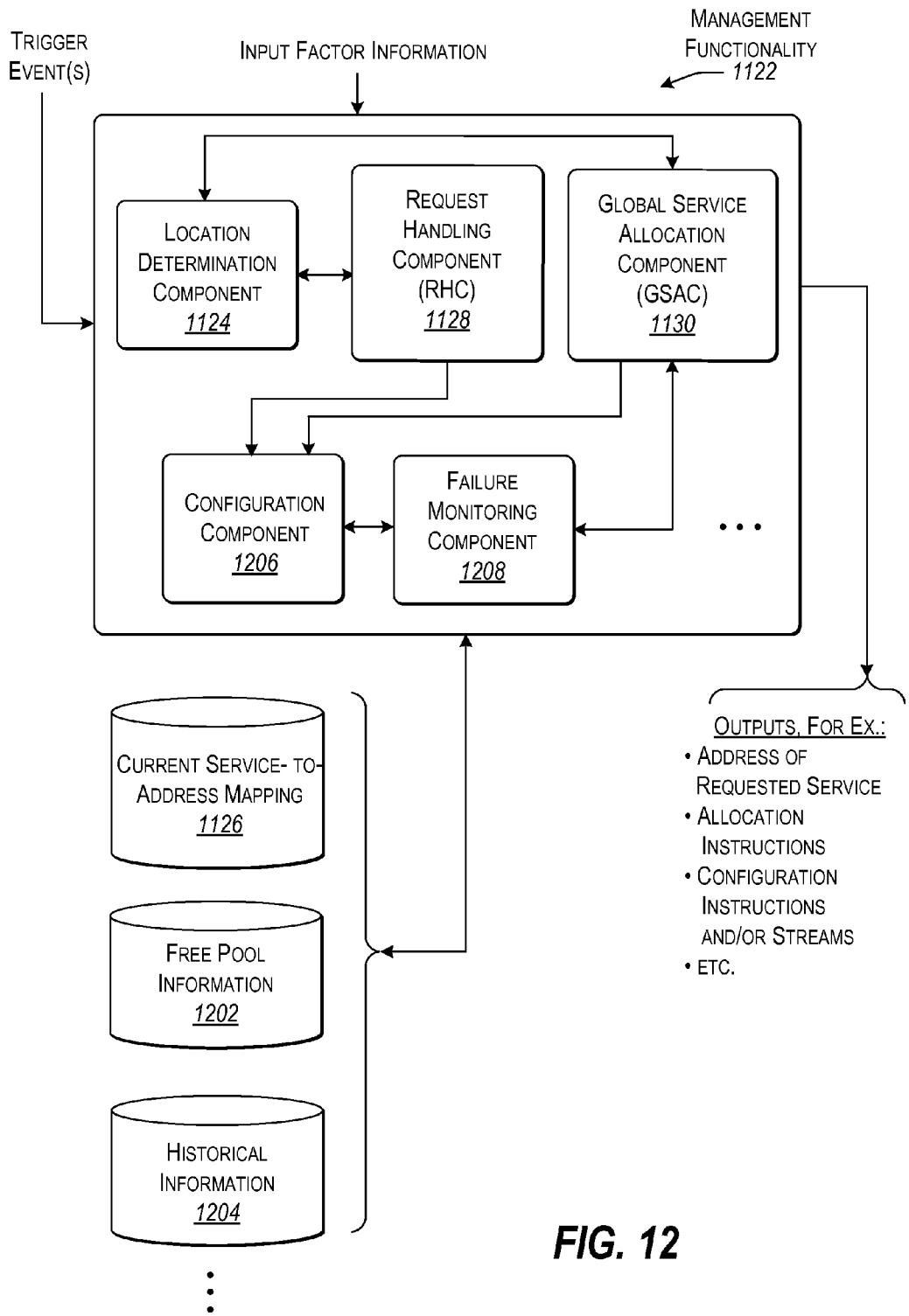
FIG. 12 illustrates an example architecture with additional components of the management functionality of FIG. 11.

FIG. 12 illustrates an example architecture with additional components of management functionality 1122. As described, location determination component 1124 identifies the current location of services within architecture 102, based on information stored in the data store 1126. In operation, the location determination component 1124 receives a request for a service. In response, it returns the address of the service, if present within the data store 1126. The address may identify a particular acceleration component that implements the service.

Request handling component (RHC) 1128 handles requests for services by tenant functionality that resides on the host components. In response to each request by a local host component, RHC 128 determines an appropriate component to implement the service. For example, RHC 128 may choose from among: a local acceleration component (associated with the local host component that made the request), a remote acceleration component, or the local host component itself (whereupon the local host component will implement the service in software), or some combination thereof. RHC 128 performs its determinations based on one or more request handling considerations.

General allocation component (GSAC) 130, on the other hand, operates by globally allocating services to acceleration components within architecture 102 to meet overall anticipated demand in the data processing system and/or to satisfy other objectives (rather than individual requests by host components). In performing its functions, the GSAC component 1130 may draw on a data store 1202 that provides free pool information. The free pool information identifies acceleration components that have free capacity to implement one or more services. The GSAC 1130 can also receive input information that has a bearing on its allocation decisions. One such piece of input information pertains to historical demand information associated with a service, e.g., as maintained in a data store 1204.

GSAC 1130 and RHC 1128 may use, in part, common logic in reaching their allocation decisions, and that common logic may, in part, taken into account similar allocation considerations. Further, both RHC 1128 and GSAC 1130 interact with the location determination component 124 in the course of performing their respective operations. Otherwise, as described, the GSAC 1130 frames its decisions in a global context, whereas the RHC 1128 is an on-demand component that is primarily focused on satisfying specific requests.

Configuration component 1206 configures acceleration components, e.g., by sending a configuration steam to the acceleration components. A configuration stream specifies the logic (e.g., an image) to be "programmed" into a recipient acceleration component. The configuration component 1206 may use different strategies to configure an acceleration component.

The failure monitoring component 1208 determines whether a previously configured acceleration component has failed. Various components of the management functionality 1122 may respond to failure notification by substituting a spare acceleration component for a failed acceleration component, reconfiguring an acceleration component, partial reconfiguring acceleration component, reloading data in an acceleration component, etc.

As described, functionality for a service or portion thereof can be provided by composing roles from a group of interoperating acceleration components. The roles can be composed in a directed graph in any variety of different ways, including a directed acyclic graph, a directed cyclic graph, etc., to provide a role. For example, in some aspects, roles are composed in a pipeline or ring.

Figure 13A:
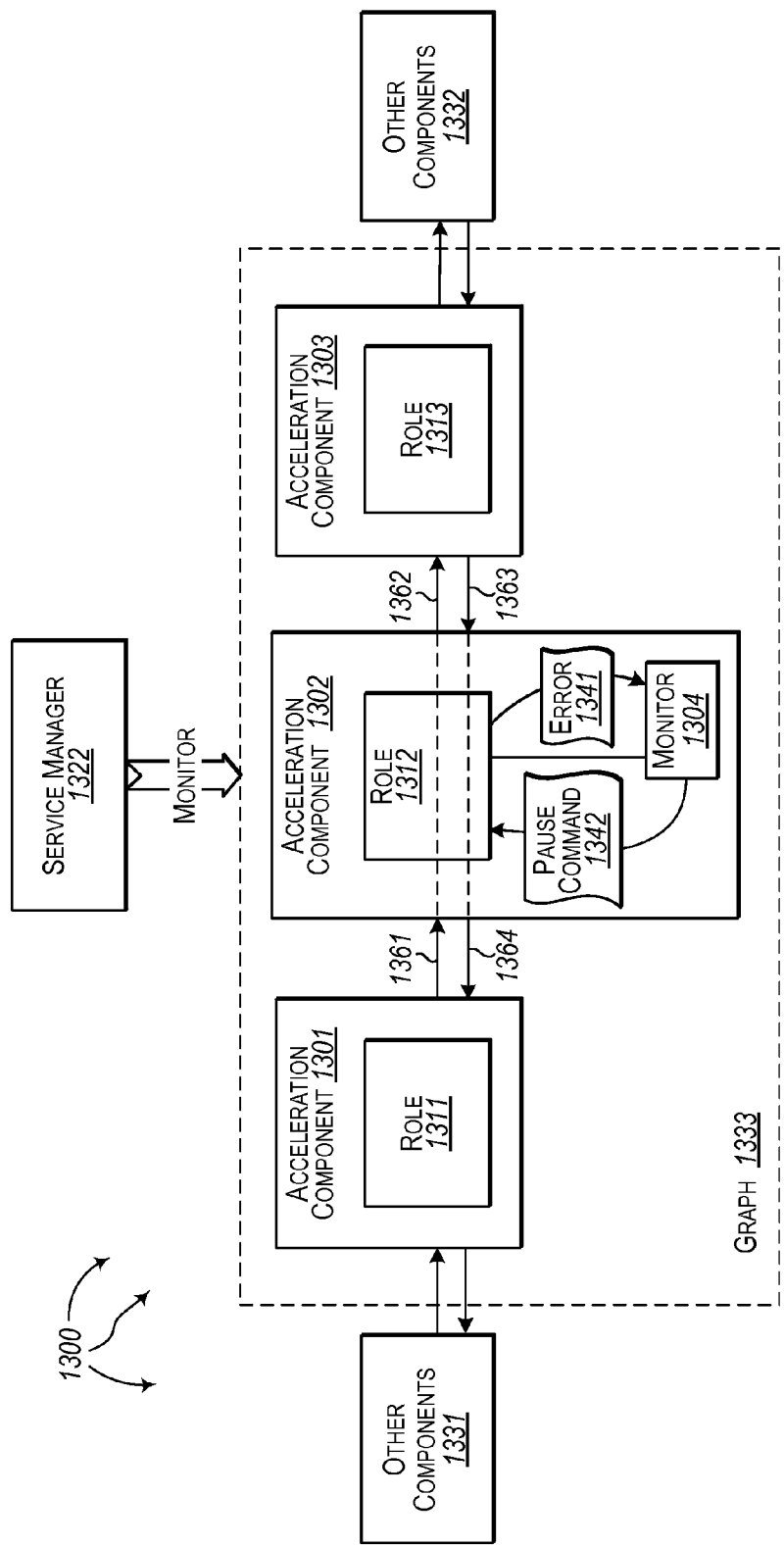
FIGS. 13A-13C illustrate an example architecture that facilitates restoring functionality at an acceleration component.
Figure 13B:
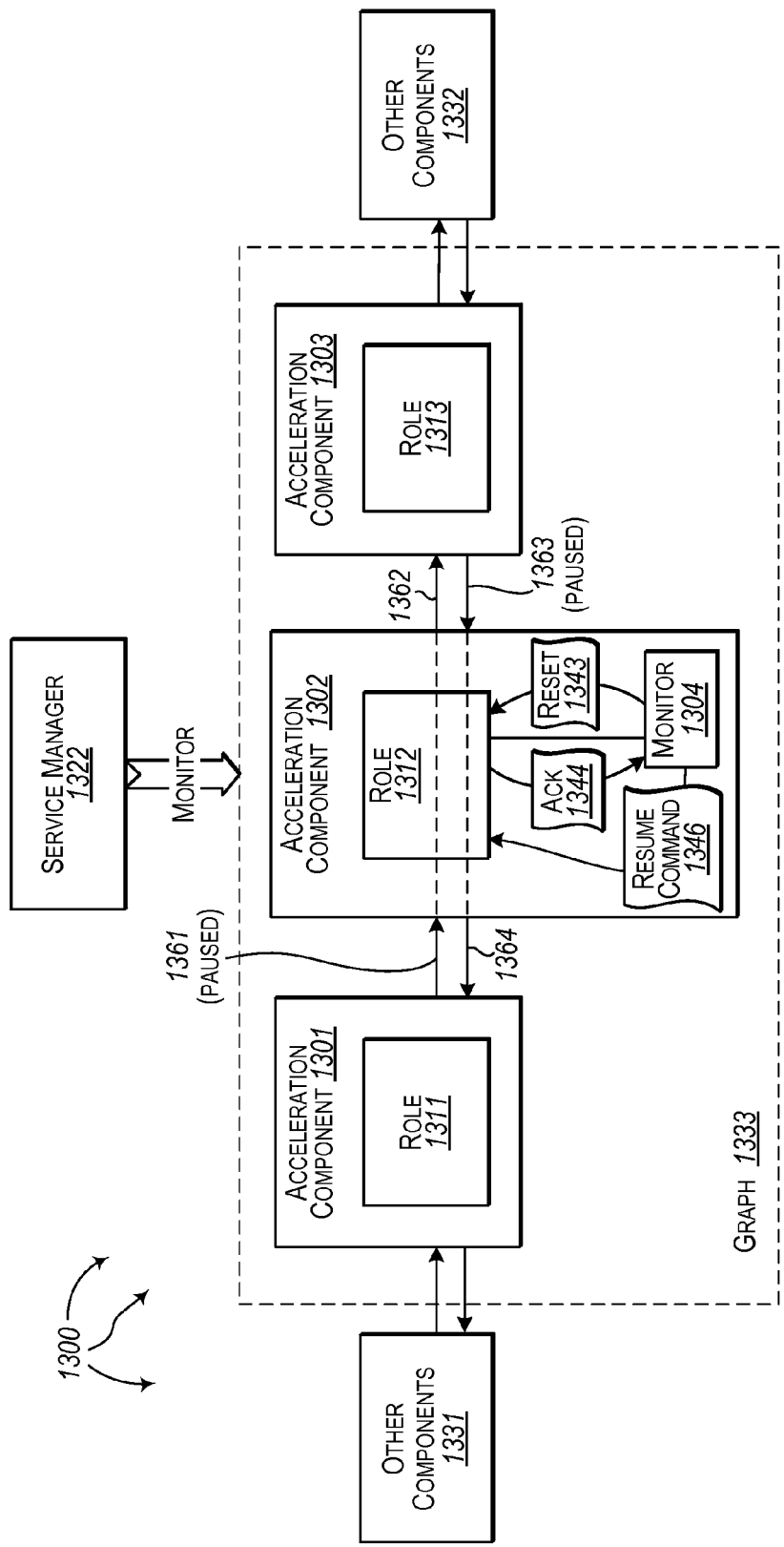
Figure 13C:
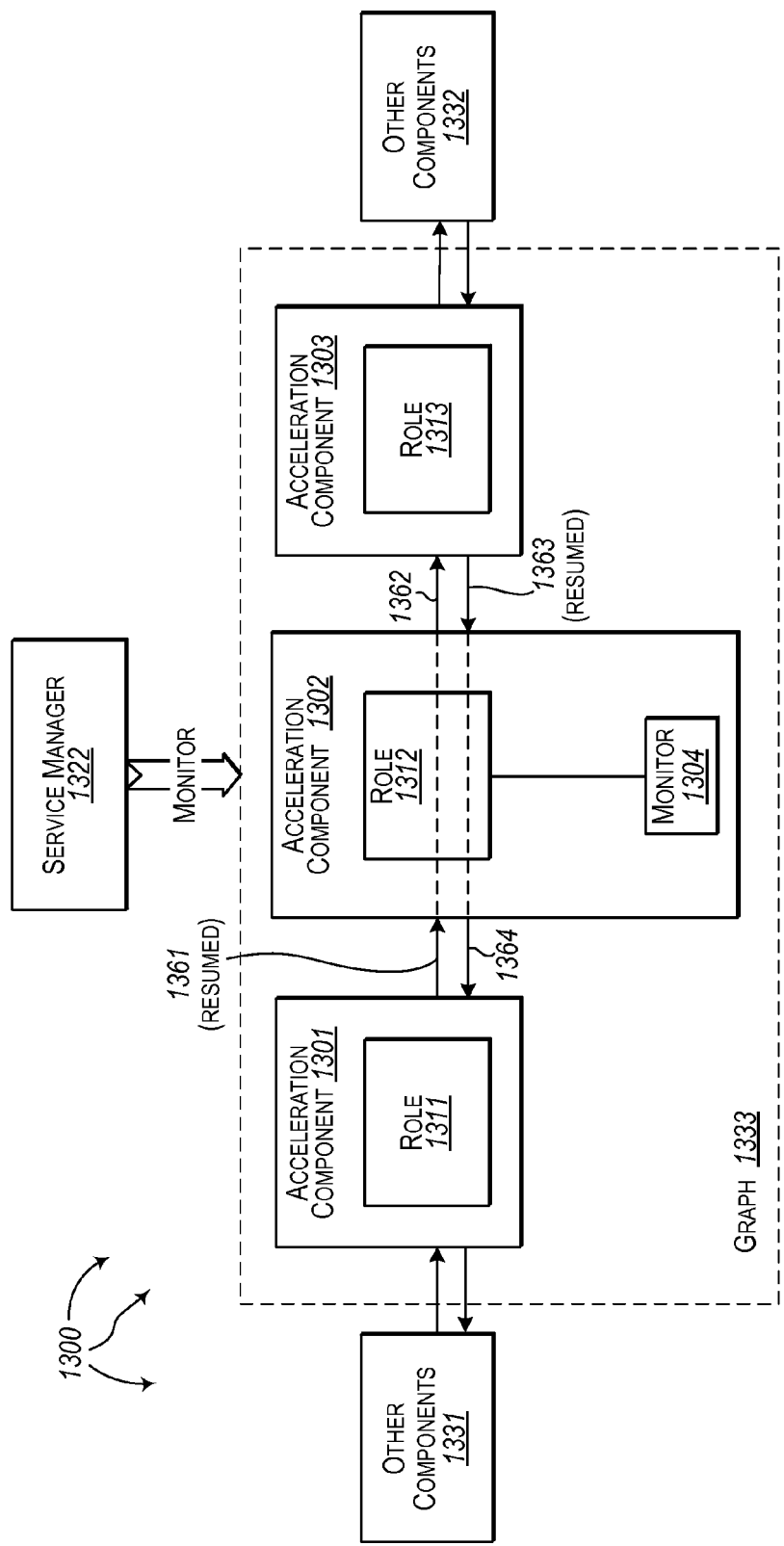

FIGS. 13A-13C illustrate an example architecture 1300 that facilitates restoring functionality at an acceleration component. Referring initially to FIG. 13A, computer architecture 1300 includes acceleration components 1301-1303, other components 1331 and 1332, and service manager 1322. Acceleration components 1301-1303 (e.g., FPGAs), other components 1331 and 1332, and service manager 1322 can be connected to (or be part of) a network, such as, for example, a Local Area Network ("LAN"), a Wide Area Network ("WAN"), and even the Internet. Accordingly, acceleration components 1301-1303, other components 1331 and 1332, and service manager 1322. as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, acceleration components 1301-1303, other components 1331 and 1332, and service manager 1322 are connected to network infrastructure 120. Acceleration components 1301-1303 can be included in hardware acceleration plane 106. Other components 1331 and 1332 can include host components and/or other acceleration components. The host components and/or other acceleration components can be included in software plane 104 and/or hardware acceleration plane 106 respectively.

Each of acceleration components 1301-1303 can include an array of programmable logic blocks and hierarchy of reconfigurable interconnects that allow logic blocks to be connected together in different configurations to provide different functionality (i.e., different roles). Image files can be received and loaded at acceleration component acceleration components 1301-1303 to configure programmable logic blocks and configure interconnects to provide desired functionality (i.e., roles).

As depicted, acceleration components 1301, 1302, and 1303 are programmed with roles 1311, 1312, and 1313 respectively. Roles 1311, 1312, and 1313 are linked together to compose graph 1333. Graph 1333 provides service acceleration for a service, such as, for example, document ranking, encryption, compression, computer vision, speech translation, etc. The depicted arrangement of acceleration components 1301, 1302, and 1303 is logical. The physical proximity of acceleration components 1301, 1302, and 1303 relative to one another can vary (e.g., same server, different servers same rack, different racks, etc.).

Input and output from roles at (logically) neighboring acceleration components may depend on one another or input and output from other components 1331 and/or other components 1332 (e.g., host components or functionality composed from a different group of interoperating acceleration components). For example, input to role 1312 can depend on output from role 1311 (communication 1361). Similarly, input to role 1313 can depend on output from role 1312 (communication 1362).

Some or all of acceleration components 1301, 1302, and 1303 can participate in one-way or two-communication with (logically) neighboring acceleration components and other components (e.g., host components). Thus, input and output from one acceleration component can depend on input and output from another acceleration component and vice versa. For example, input to role 1312 can depend on output from role 1313 (communication 1363) and input to role 1311 can depend on output from role 1312 (communication 1364).

Graph 1333 can provide service acceleration for an entire service or part of a service. For example, graph 1333 can be used to accelerate part of a document ranking service used to provide search engine results. Graph 1333 can interoperate with other portions of service functionality composed from other groups of interoperating acceleration components and/or provided by one or more host components. For example, for a document ranking service, acceleration for document feature extraction can be composed from one group of interoperating acceleration components, acceleration for free form expression calculations can be composed from another group of interoperating acceleration components, and acceleration for scoring calculations can be composed from a further group of interoperating acceleration components.

In addition to the expressly depicted roles 1311, 1312, and 1313, one or more of acceleration components 1301, 1302, and 1303 can also be programmed with one or more other roles. The one or more other roles can be configured to provide part of other service functionality, for example, relating to accelerating encryption, compression, computer vision, speech translation, etc. Thus, one or more of acceleration components 1301, 1302, and 1303 may simultaneously be composed into one or more different groups of interoperating acceleration components that provide different functionality for different services.

In general, service manager 1322 is configured to monitor network infrastructure 120. When appropriate, service manager 1322 can reconfigure acceleration components in hardware acceleration plane 106 to restore service acceleration for a service. From time to time, for example, due to a detected error or failure, for installation of an upgrade, etc., a role at an acceleration component can be reconfigured. Service manager 1322 can manage a reconfiguration protocol for orderly reconfiguration of a role. Service manager 1322 can include any of the components and functionality described with respect to management functionality 232 and management functionality 1122 as well as any other appropriate components and functionality for implementing the reconfiguration protocol.

Acceleration component 1302 also includes monitor 1304 for locally monitoring role 1302 at acceleration component 1302. Monitor 1304 can monitor communication 1361, 1362, 1363, and 1364 between role 1312 and roles 1311 and 1313. Monitor 1304 and role 1312 can be loaded onto acceleration component 1302 from the same image file. The image file can define legitimate behavior for role 1312.

Figure 14:
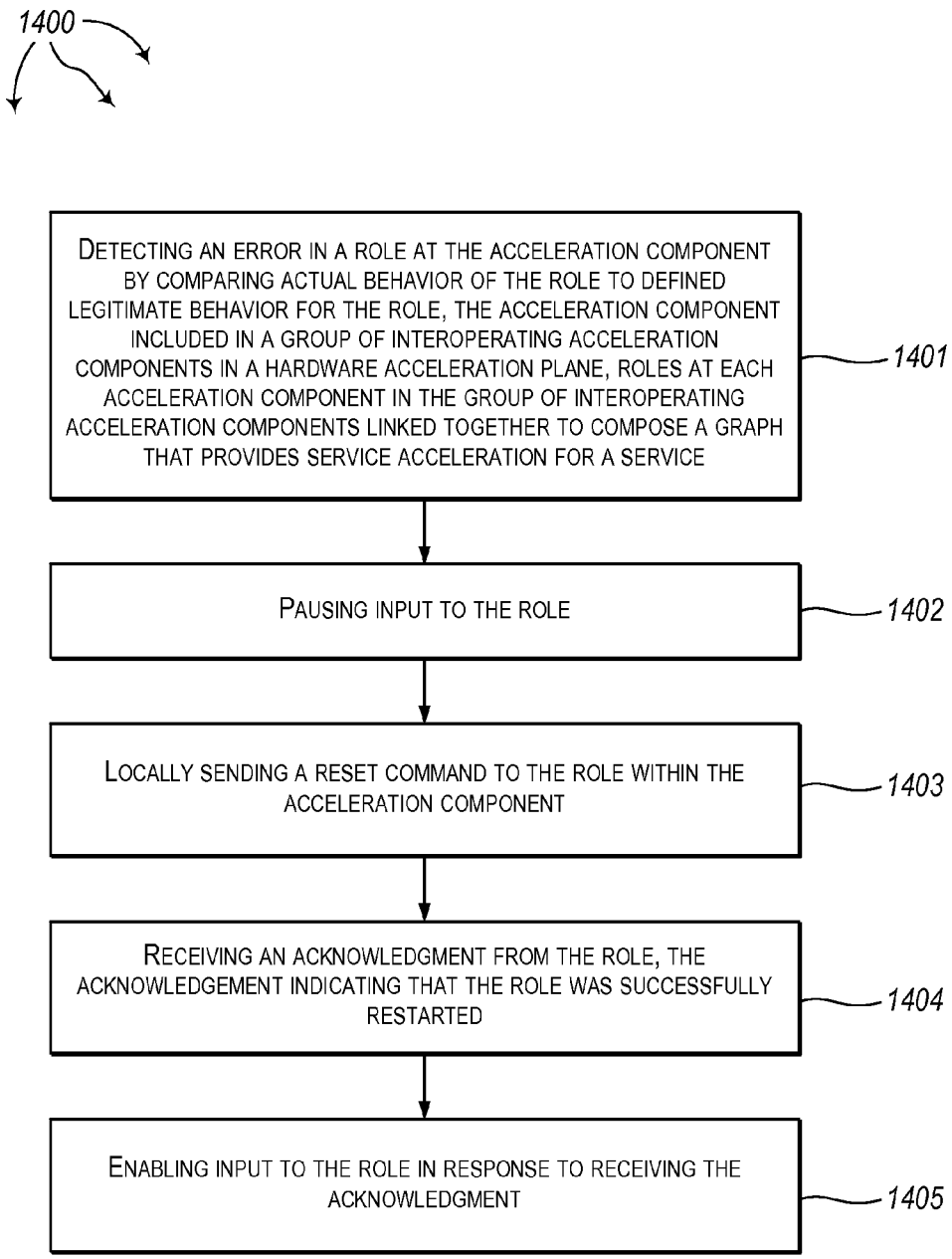
FIG. 14 illustrates a flow chart of an example method for restoring functionality at an acceleration component.

FIG. 14 illustrates a flow chart of an example method for restoring functionality at an acceleration component. Method 1400 will be described with respect to the components and data of architecture 1300.

Method 1400 includes detecting an error in a role at the acceleration component by comparing actual behavior of the role to defined legitimate behavior for the role, the acceleration component included in a group of interoperating acceleration components in a hardware acceleration plane, roles at each acceleration component in the group of interoperating acceleration components linked together to compose a graph that provides service acceleration for a service (1401). For example, during monitoring, monitor 1304 can detect error 1341 in the operation of role 1312. A variety of different conditions may cause an error. If inputs are queued up for a specified period of time with no output (i.e., a timeout), monitor 1304 can detect that role 1302 is hung. Output properties, divide by zero exceptions, and other performance characteristics of role 1312 can also indicate errors in the operation of role 1312. In some aspects, monitor 1304 compares monitored behavior of role 1312 against defined legitimate behavior for 1312 to determine if there is an error in the operation of role 1312.

Method 1400 includes pausing input to the role (1402). For example, monitor 1304 can send pause command 1342 to role 1312. Pause command 1342 instructs role 1312 to pause incoming data. Turning to FIG. 13B, communication 1361 and 1363 are paused. However, communication 1362 and 1364 continue to output data to role 1312. Any data output to role 1312 can be buffered until legitimate behavior of role 1312 restored.

Method 1400 includes locally sending a reset command to the role within the acceleration component (1403). For example, monitor 1304 can send reset 1343 to role 1312. Reset 1343 resets role 1312 by resetting internal state of acceleration component 1302 corresponding to role 1312. Any partially processed service data can be buffered prior to reset. If partially processed data cannot recovered, a NACK or synthetic response for the data can be propagated back to the originator. A synthetic response can include a NULL result and/or debug information.

Method 1400 includes receiving an acknowledgment from the role, the acknowledgement indicating that the role was successfully restarted (1404). For example, monitor 1304 can receive ACK 1344 from role 1312. When role 1312 is reset, ACK 1344 is returned to monitor 1304. ACK 1344 indicates to monitor 1304 that reset 1343 was successful.

Method 1400 includes enabling input to the role in response to receiving the acknowledgment (1405). For example, monitor 1304 can send resume command 1346 to role 1312. Resume command 1346 instructs role 1312 to resuming handling of incoming data. Turning to FIG. 13C, communication 1361 and 1363 are resumed. Since role 1312 was reset (restored) locally, service manager 1322 may be unware that error 1341 even occurred. For example, buffers used by acceleration components 1301, 1302, and 1303 may have been sufficient to buffer data until role 1312 was restored. As such, service manager 1322 does not detect any incorrect behavior from service 1300.

However, if role 1312 cannot be locally restored after some amount of time, service manager 1322 may detect incorrect behavior at graph 1333 and/or more specifically at acceleration component 1302. For example, graph 1333 can exhibit incorrect behaviors, such as, for example, non-responsiveness, performance degradation, outputting incorrect results, sending phantom packets, latency spikes, etc. In response, service manager 1322 can query the status of acceleration components 1301, 1302, and 1303 and determine an error in operation of role 1312. The error in operation of role 1312 can in turn cause the incorrect behavior exhibited by graph 1333. In response, service manager 1322 can attempt to restore role 1312 by reloading an image file (e.g., for role 1312) to acceleration component 1302.

In another aspect, service manager 1322 can detect error 1341 (or a related, derived, or propagated error) prior to monitor 1304 detecting error 1341. In response, service manager 1322 can instruct monitor 1304 to locally restore role 1312 (e.g., by sending reset command 1343). Monitor 1304 can attempt to locally restore role 1312. If role 1312 cannot be locally restored after some amount of time, service manager 1322 can attempt to restore role 1312 by reloading an image file (e.g., for role 1312) to acceleration component 1302.

Figure 15A:
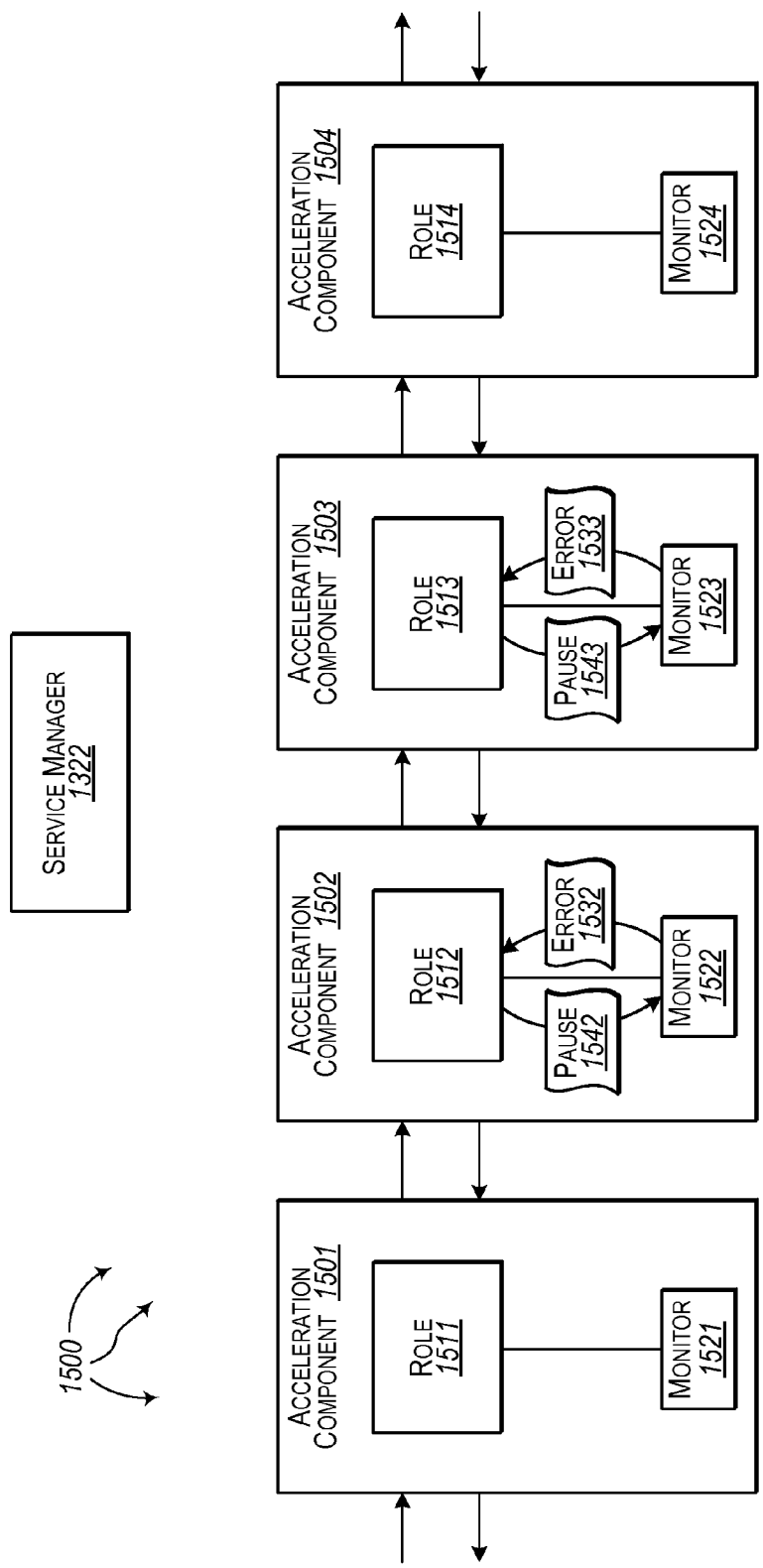
FIGS. 15A-15C illustrate an example architecture that facilitates restoring functionality at multiple acceleration components in parallel.
Figure 15B:
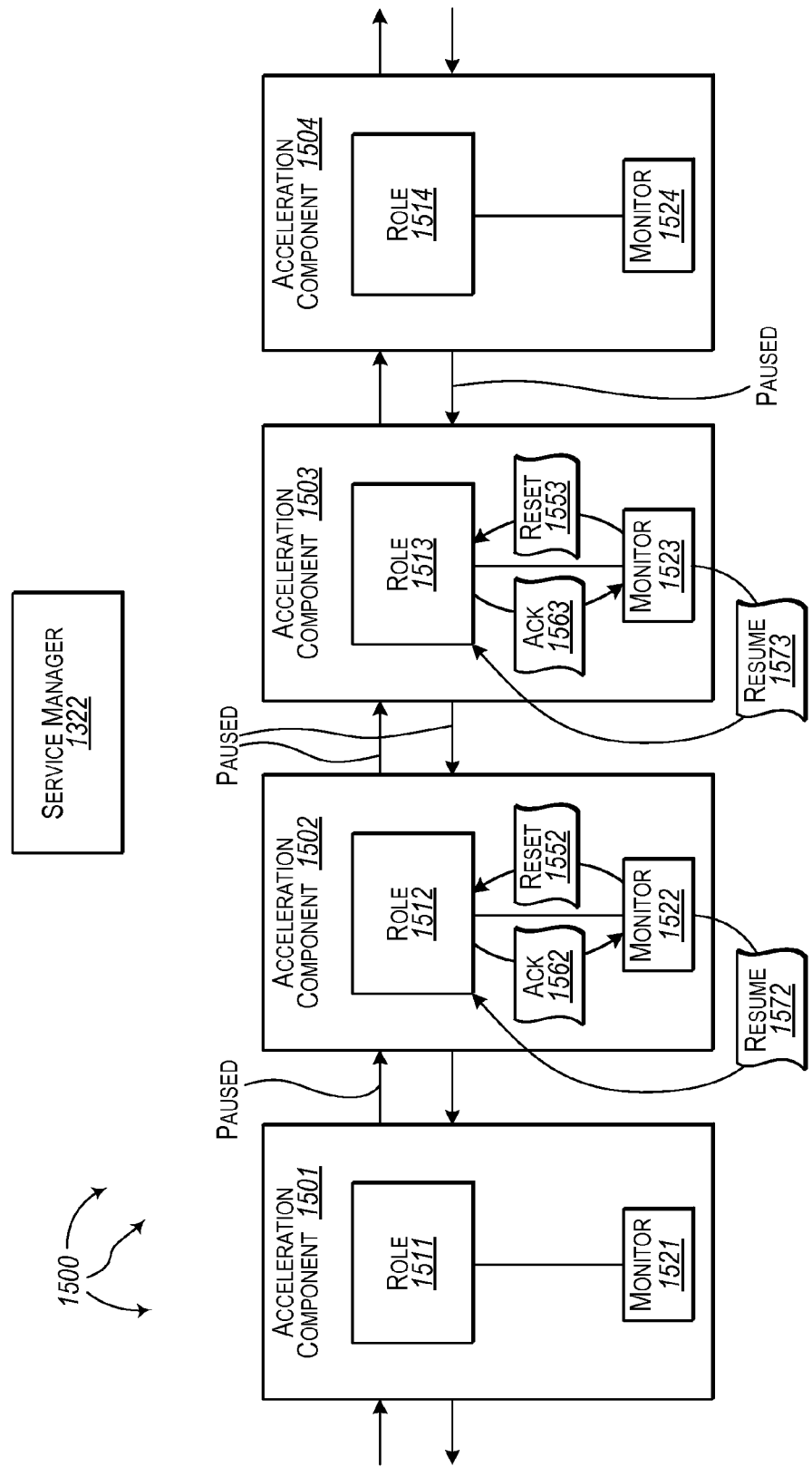
Figure 15C:
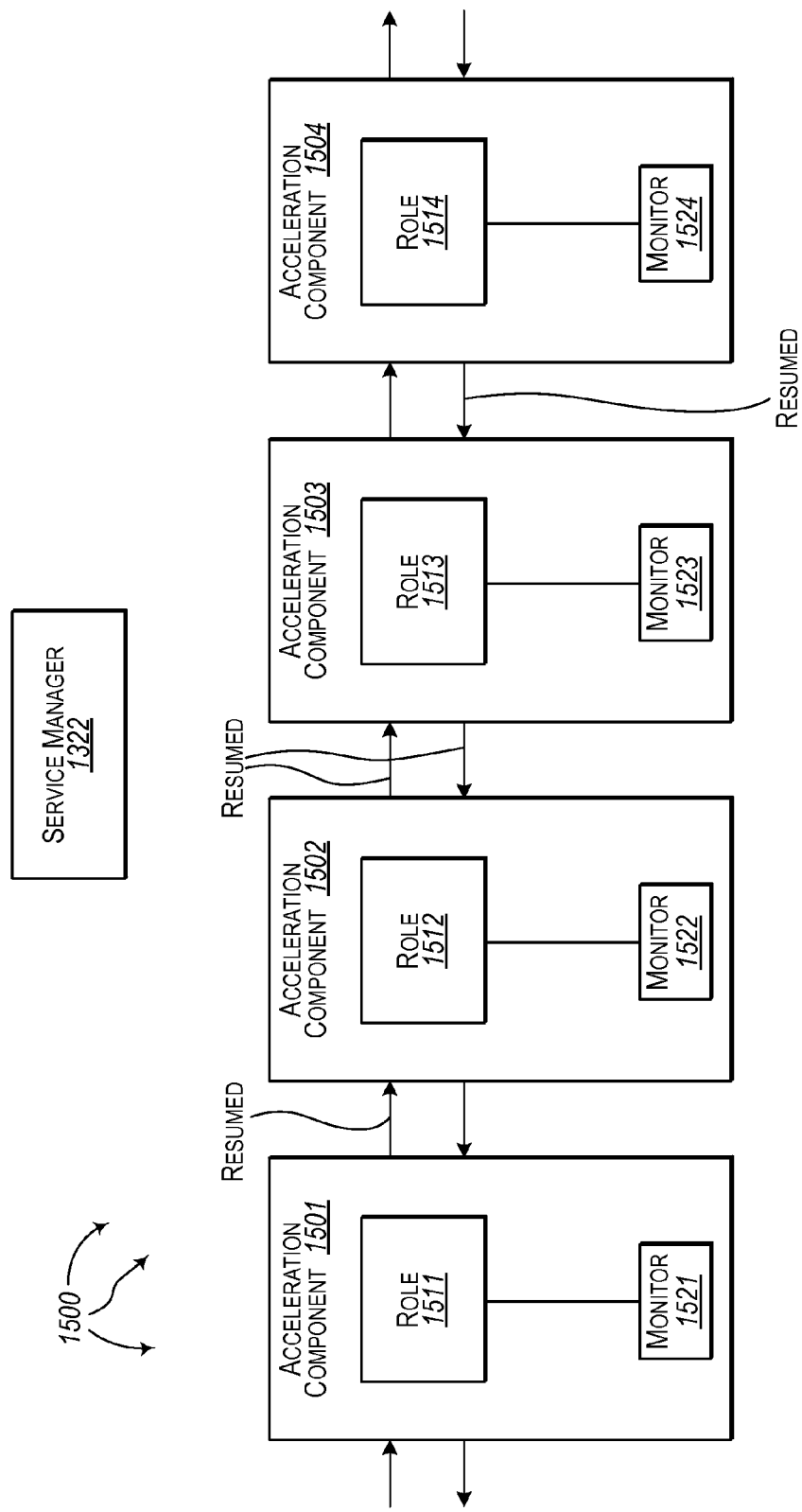

FIGS. 15A-15C illustrate an example architecture 1500 that facilitates restoring functionality at multiple acceleration components in parallel. Referring initially to FIG. 15A, computer architecture 1500 includes acceleration components 1501-1504 and service manager 1322. Acceleration components 1501-1504 (e.g., FPGAs) and service manager 1322 can be connected to (or be part of) a network, such as, for example, a Local Area Network ("LAN"), a Wide Area Network ("WAN"), and even the Internet. Accordingly, acceleration components 1501-1504 and service manager 1322, as well as any other connected computer systems and their components (e.g., host components), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, acceleration components 1501-1504 and service manager 1322 are connected to network infrastructure 120. Acceleration components 1501-1504 can be included in hardware acceleration plane 106. Other components can include host components and/or other acceleration components. The host components and/or other acceleration components can be included in software plane 104 and/or hardware acceleration plane 106 respectively.

Each of acceleration components 1501-1504 can include an array of programmable logic blocks and hierarchy of reconfigurable interconnects that allow logic blocks to be connected together in different configurations to provide different functionality (i.e., different roles). Image files can be received and loaded at acceleration component acceleration components 1501-1504 to configure programmable logic blocks and configure interconnects to provide desired functionality (i.e., roles).

As depicted, acceleration components 1501, 1502, 1503, and 1504 are programmed with roles 1511, 1512, 1513, and 1514 respectively. Roles 1511, 1512, 1513, and 1514 can be linked together to compose a graph. The graph provides service acceleration for a service, such as, for example, document ranking, encryption, compression, computer vision, speech translation, etc. The depicted arrangement of acceleration components 1501, 1502, 1503, and 1504 is logical. The physical proximity of acceleration components 1501, 1502, 1503, and 1504 relative to one another can vary (e.g., same server, different servers same rack, different racks, etc.).

Some or all of acceleration components 1501, 1502, 1503, and 1504 can participate in one-way or two-communication with (logically) neighboring acceleration components and other components (e.g., host components). Thus, input and output from one acceleration component can depend on input and output from another acceleration component and vice versa. For example, input to role 1512 can depend on output from role 1513 and input to role 1511 can depend on output from role 1512. Similarly, input to role 1512 can depend on output from role 1511 and input to role 1513 can depend on output from role 1512. The depicted arrows indicate input and output to the roles in architecture 1500.

The graph composed from linked roles 1511, 1512, 1513, and 1514 can provide service acceleration for an entire service or part of a service. For example, the graph can be used to accelerate part of a document ranking service used to provide search engine results. The graph can interoperate with other portions of service functionality composed from other groups of interoperating acceleration components and/or provided by one or more host components. For example, for a document ranking service, acceleration for document feature extraction can be composed from one group of interoperating acceleration components, acceleration for free form expression calculations can be composed from another group of interoperating acceleration components, and acceleration for scoring calculations can be composed from a further group of interoperating acceleration components.

Acceleration components 1501-1504 also include monitors 1521-1524 respectively. Monitors 1521-1524 are configured to locally monitor communication to and from roles 1511-1514 respectively. During operation of the graph, monitor 1522 can detect error 1532 in role 1512. In response, monitor 1522 can send pause command 1542 to role 1512 to pause input to role 1512. In parallel (and possibly related to error 1532), monitor 1523 can detect error 1533 in role 1513. In response, monitor 1523 can send pause command 1543 to role 1513 to pause input to role 1513.

Turning to FIG. 15B, inputs to roles 1512 and 1513 are paused. Monitor 1522 can send reset 1552 to role 1512 to reset role 1512. When reset is successful, role 1512 sends ACK 1562 to monitor 1522. Upon receiving ACK 1562, monitor 1522 views role 1512 to be restored. Monitor 1522 then sends resume command 1572 to role 1512. In response to resume command 1572, role 1512 resumes handling input.

In parallel, monitor 1523 can send reset 1553 to role 1513 to reset role 1513. When reset is successful, role 1513 sends ACK 1563 to monitor 1523. Upon receiving ACK 1563, monitor 1523 views role 1513 to be restored. Monitor 1523 then sends resume command 1573 to role 1513. In response to resume command 1573, role 1513 resumes handling input.

Turning to FIG. 15C, input both to role 1512 and to role 1513 is resumed.

Thus, roles 1512 and 1513 are locally reset (restored) in parallel. Since roles 1512 and 1513 are reset (restored) locally, service manager 1322 may be unware that errors 1532 and 1533 even occurred. For example, buffers used by acceleration components 1501, 1502, 1503, and 1504 may have been sufficient to buffer service data until roles 1512 and 1513 are (reset) restored. As such, service manager 1322 does not detect any incorrect behavior from the composed service.

However, if one or more of roles 1512 and 1513 cannot be locally restored after some amount of time, service manager 1322 may detect incorrect behavior at acceleration component 1502 or 1503 and/or at the composed service. In response, management service 1522 can query the status acceleration components 1501, 1502, 1503, and 1504 and determine an error in operation of role 1512 and/or of role 1513. The error in operation of role 1512 and/or 1513 can in turn cause incorrect behavior exhibit by the graph. In response, service manager 1322 can attempt to restore role 1512 and/or role 1513 by reloading an appropriate image file to acceleration component 1502 and/or to acceleration component 1503 respectively.

In another aspect, service manager 1322 can detect error 1532 and/or error 1533 (or related, derived, or propagated errors) prior to detection by local monitors. In response, service manager 1322 can instruct monitor 1522 and/or monitor 1523 to locally restore role 1512 and/or role 1513 respectively (e.g., by sending a reset command). In response, monitor 1522 can attempt to locally restore role 1512 and/or monitor 1523 can attempt to locally restore role 1513. If role 1512 and/or 1513 cannot be locally restored after some amount of time, service manager 1322 can attempt to restore role 1512 and/or 1513 by reloading an appropriate image file to acceleration component 1502 and/or acceleration component 1503 respectively.

Figure 16:
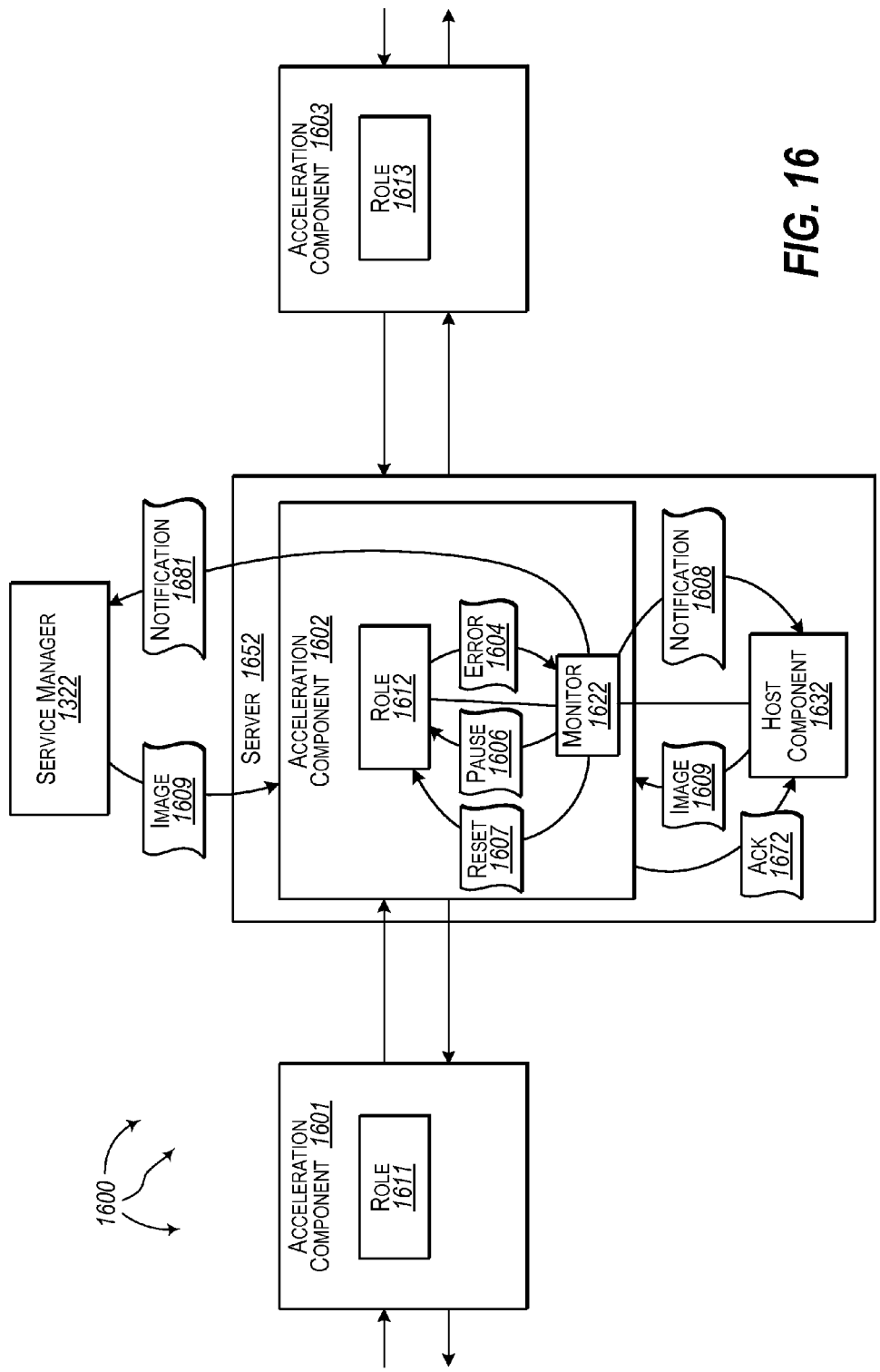
FIG. 16 illustrates an example architecture that facilitates restoring functionality at an acceleration component in a server.

FIG. 16 illustrates an example architecture 1600 that facilitates restoring functionality at an acceleration component in a server. Computer architecture 1600 includes acceleration components 1601-1603 and service manager 1322. Acceleration components 1601-1603 (e.g., FPGAs) and service manager 1322 can be connected to (or be part of) a network, such as, for example, a Local Area Network ("LAN"), a Wide Area Network ("WAN"), and even the Internet. Accordingly, acceleration components 1601-1603 and service manager 1322, as well as any other connected computer systems and their components (e.g., host components), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, acceleration components 1601-1603, other components and service manager 1322 are connected to network infrastructure 120. Acceleration components 1601-1603 can be included in hardware acceleration plane 106. Other components can include host components and/or other acceleration components. The host components and/or other acceleration components can be included in software plane 104 and/or hardware acceleration plane 106 respectively.

Each of acceleration components 1601-1603 can include an array of programmable logic blocks and hierarchy of reconfigurable interconnects that allow logic blocks to be connected together in different configurations to provide different functionality (i.e., different roles). Image files can be received and loaded at acceleration component acceleration components 1601-1603 to configure programmable logic blocks and configure interconnects to provide desired functionality (i.e., roles).

As depicted, acceleration components 1601, 1602, and 1603 are programmed with roles 1611, 1612, and 1614 respectively. Roles 1611, 1612, and 1613 can be linked together to compose a graph. The graph provides service acceleration for a service, such as, for example, document ranking, encryption, compression, computer vision, speech translation, etc. The depicted arrangement of acceleration components 1601, 1602, and 1603 is logical. The physical proximity of acceleration components 1601, 1602, and 1603 relative to one another can vary (e.g., same server, different servers same rack, different racks, etc.).

Some or all of acceleration components 1601, 1602, and 1603 can participate in one-way or two-communication with (logically) neighboring acceleration components and other components (e.g., host components). Thus, input and output from one acceleration component can depend on input and output from another acceleration component and vice versa.

Roles 1611, 1612, and 1613 can be linked to compose a graph that provides service acceleration for an entire service or part of a service. For example, the graph can be used to accelerate part of a document ranking service used to provide search engine results. The graph can interoperate with other portions of service functionality composed from other groups of interoperating acceleration components and/or provided by one or more host components. For example, for a document ranking service, acceleration for document feature extraction can be composed from one group of interoperating acceleration components, acceleration for free form expression calculations can be composed from another group of interoperating acceleration components, and acceleration for scoring calculations can be composed from a further group of interoperating acceleration components.

As depicted, acceleration component 1602 along with host component 1632 (e.g., CPU) are included in server 1652. Host component 1632 can be included with other host components in software plane 104.

During operation of the graph, monitor 1622 can detect error 1604 in role 1612. In response, monitor 1622 can send pause command 1606 to role 1612 to pause input to role 1612. When inputs to role 1612 are paused, monitor 1622 can send reset 1607 to role 1612 to reset role 1612. After some time without receiving an ACK of reset 1607, monitor 1622 can determine that role 1612 is not reset and/or that role 1612 cannot be restored locally within acceleration component 1602. In response, monitor 1622 can wait for an external component to take further action and/or can notify an external component of error 1604.

For example, monitor 1622 can send notification 1608 to host component 1632 via local link 1624. Notification 1608 notifies host component 1632 of error 1604. From notification 1608, host component 1632 can infer that role 1612 cannot be restored locally within acceleration component 1602. Alternately, host component 1632 can independently monitor acceleration component 1602 via local link 1624 and detect an error with role 1512 (e.g., a related, propagated, or derived error associated with error 1604).

In response to notification 1608 and/or independent detection of an error with role 1612, host component 1632 can instruct acceleration component 1602 to load image 1609 (an image for role 1612). Image 1609 can be loaded from local storage associated with host component 1632 or from a location in network infrastructure 120. When image 1609 is successfully loaded, acceleration component 1602 can return ACK 1672 to host component 1632. ACK 1672 indicates to host component 1632 that image 1609 was successfully loaded at acceleration component 1602. Host component 1632 or monitor 1622 can then resume inputs to role 1612.

If host component 1632 does not respond to notification 1608 or after some amount of time, monitor 1622 can send notification 1681 to service manager 1322 via network communication. Notification 1681 notifies service manager 1322 of error 1604. From notification 1681, service manager 1322 can infer that role 1612 cannot be restored locally within acceleration component 1602 (and possibly also that local host 1632 is unable to restore role 1612, for example, because local host 1632 lacks access to image 1609). Alternately, service manager 1322 can independently monitor acceleration component 1602 via network communication and detect an error with role 1612 (e.g., a related, propagated, or derived error associated with error 1604).

In response to notification 1681 and/or independent detection of an error with role 1612, service manager 1322 can instruct acceleration component 1602 to load image 1609 (an image for role 1612). Image 1609 can be loaded from a location in network infrastructure 120. When image 1609 is successfully loaded, acceleration component 1602 can acknowledge service manager 1322. Service manager 1322 or monitor 1622 can then resume inputs to role 1612.

In another aspect, local host 1632 can detect error 1604 (or a related, derived, or propagated error) prior to monitor 1622 detecting error 1604. In response, local host 1632 can instruct monitor 1622 to locally restore role 1612 (e.g., by sending reset command 1607). Monitor 1622 can attempt to locally restore role 1612. If role 1612 cannot be locally restored after some amount of time, local host 1632 can attempt to restore role 1612 by reloading image file 1609 to acceleration component 1502.

If local host 1632 does not have access to image file 1609, local host 1632 can contact service manager 1322.

Accordingly, errors within a role can be detected locally by an acceleration component monitor, by a locally linked host component, or a higher-level software service. Reset or other restoration of the role can be attempted locally at the acceleration component. If unsuccessful, the locally linked host component can attempt to restore the role. If unsuccessful, the higher-level software service can attempt to restore the role. If unsuccessful, the acceleration component can be declared bad.

Aspects of the thus help mitigate (and potentially eliminate) the possibility of introducing and/or propagating instability into a hardware acceleration plane and/or software plane. Aspects address the following problems at least in part: (a) an acceleration component (e.g., an FPGA) appearing as a failed (e.g., PCIe) device to the host, raising a destabilizing non-maskable interrupt and (b) a failing or reconfiguring acceleration component (e.g., an FPGA) corrupting the state of its neighbors by randomly sending traffic that may appear valid. Acceleration components (e.g., FPGAs) remain robust to traffic from neighbors with incorrect or incompatible configurations (e.g. "old" data from FPGAs that have not yet been reconfigured).

A solution to a reconfiguring a (e.g., PCIe) device is that the driver that sits behind the acceleration component (e.g., FPGA) reconfiguration call first disables non-maskable interrupts for the specific acceleration component (e.g., FPGA) during reconfiguration.

To prevent spurious data from corrupting neighboring acceleration component, the acceleration component being reconfigured (or a higher-level software service, for example, service manager 1322) sends a "TX Halt" message, indicating that the neighbors should ignore all further traffic until the link is re-established. In addition, messages can be delayed a few clock cycles so that, in case of an unexpected link failure, it can be detected and the message can be suppressed.

Similarly, when an acceleration component comes out of reconfiguration, it cannot trust that its neighbors are not emitting spurious data. To handle this, each acceleration component can come up with "RX Halt" enabled, automatically throwing away any messages for neighbors. A higher-level software service, for example, service manager 1322 tells each server to release RX Halt once acceleration components (e.g., in a graph) have been configured.

When a datacenter application hangs for any reason, a higher level service in the service hierarchy (such as a machine that aggregates results) can notice that a set of servers are unresponsive. The higher level service can query each server to find its status. If a server is unresponsive, it is put through a sequence of soft reboot, hard reboot (e.g., image reload), and then flagged for manual service and possible replacement, until the machine starts working correctly. If the server is operating correctly, it responds to the higher level service with information about the health of its local acceleration components (e.g., one or more FPGAs) and associated links. The higher level service can return a vector with error flags for inter-FPGA (or other acceleration component) connections, DRAM status (bit errors and calibration failures), errors in the acceleration component application, PLL lock issues, PCIe errors, and the occurrence of a temperature shutdown. The call can also return the machine IDs of neighbors of an acceleration component, to test whether the neighboring acceleration components in a graph are accessible and that they are the machines that the higher level service expects (in case the cables are miswired or unplugged).

Based on this information, the higher level service may update a failed machine list (including the failure type) and based on the failure location and type, determine where to re-locate various application roles on the fabric. It is possible that relocation is unnecessary, such as when the failure occurred on a spare node, or when simply reconfiguring an acceleration component in-place is sufficient to resolve the hang. The higher level service can then go through its reconfiguration process for every acceleration component involved in that service to clear out any corrupted state and map out any hardware failure or recurring failure with an unknown cause.

Figure 17A:
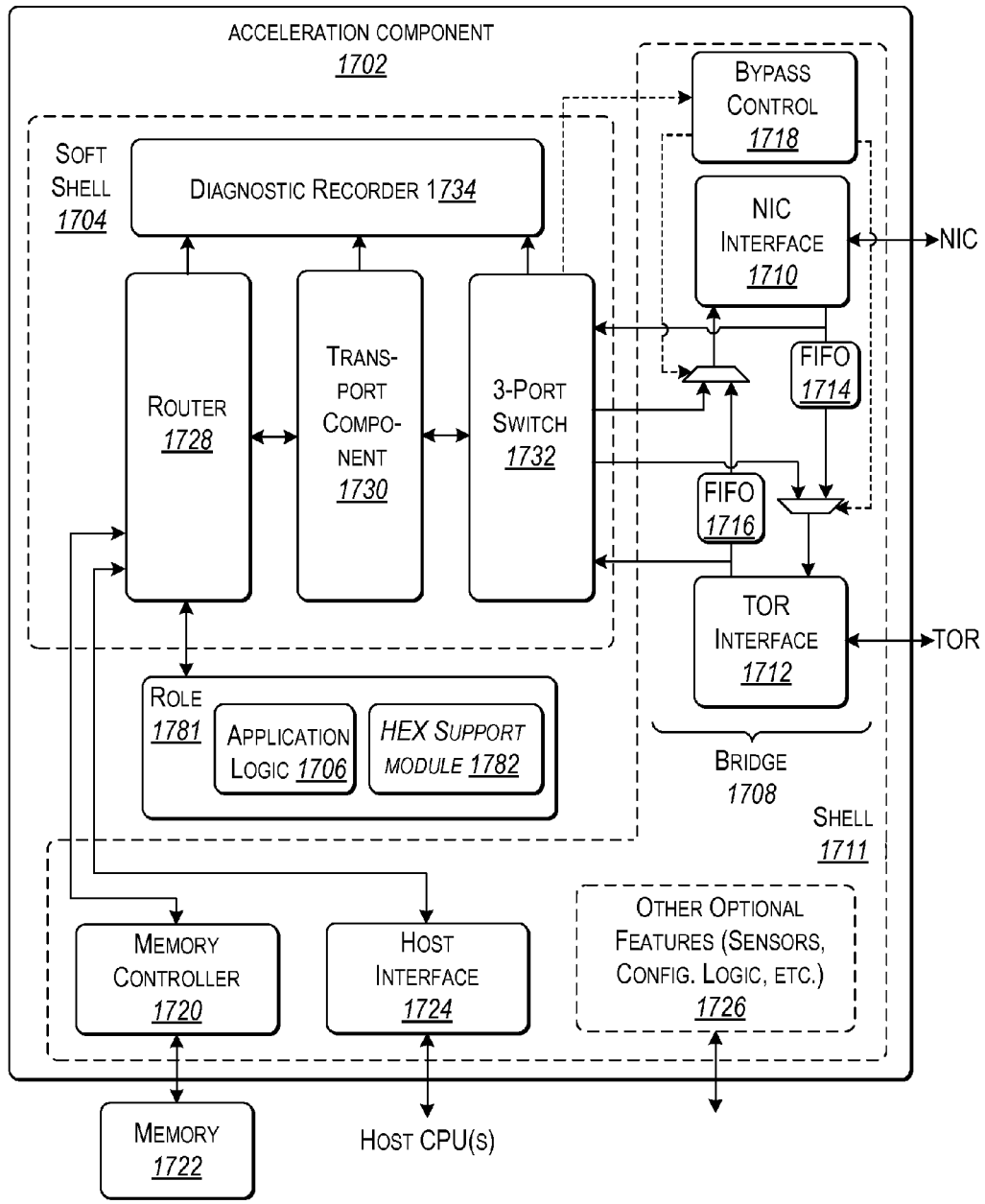
FIG. 17A illustrates an example architecture of an acceleration component.

Turning to FIG. 17A, FIG. 17A illustrates an example architecture of an acceleration component 1702. In general, components depicted in FIG. 17A have similar functionality to the components depicted in FIG. 7. Acceleration component 1702 can be included in hardware acceleration plane 106. Components included in acceleration component 1702 can be implemented on hardware resources (e.g., logic blocks and programmable interconnects) of acceleration component 702.

Acceleration component 1702 includes application logic 1706, soft shell 1704 associated with a first set of resources and shell 1711 associated with a second set of resources. The resources associated with shell 1711 correspond to lower-level interface-related components that generally remain the same across many different application scenarios. The resources associated with soft shell 1704 can remain the same across at least some different application scenarios. The application logic 1706 may be further conceptualized as including an application domain (e.g., a "role"). The application domain or role can represent a portion of functionality included in a composed service spread out over a plurality of acceleration components.

The application domain hosts role 1781. Role 1781 includes application logic 1706 and Hardware Exception (HEX) support module 1782. Application logic 1706 performs service specific tasks (such as a portion of functionality for ranking documents, encrypting data, compressing data, facilitating computer vision, facilitating speech translation, machine learning, etc.). Resources associated with soft shell 1704 are generally less subject to change compared to the application resources, and the resources associated with shell 1711 are less subject to change compared to the resources associated with soft shell 1704 (although it is possible to change (reconfigure) any component of acceleration component 1702).

In operation, application logic 1706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

HEX support module 1782 can be interposed between application logic 1706 and soft shell 1704 and can monitor application logic 1706 for degraded performance and/or failures. In the event of degraded performance and/or a failure (e.g., application logic 1706 hangs), HEX support module 1782 can generate an exception to software, including crash dump information.

Referring to shell 1711, shell resources include bridge 1708 for coupling acceleration component 1702 to the network interface controller (via a NIC interface 1710) and a local top-of-rack switch (via a TOR interface 1712). Bridge 1708 also includes a data path that allows traffic from the NIC or TOR to flow into acceleration component 1702, and traffic from the acceleration component 1702 to flow out to the NIC or TOR. Internally, bridge 1708 may be composed of various FIFOs (1714, 1716) which buffer received packets, and various selectors and arbitration logic which route packets to their desired destinations. A bypass control component 1718, when activated, can control bridge 1708 so that packets are transmitted between the NIC and TOR without further processing by the acceleration component 1702.

Memory controller 1720 governs interaction between the acceleration component 1702 and local memory 1722 (such as DRAM memory). The memory controller 1720 may perform error correction as part of its services.

Host interface 1724 provides functionality that enables acceleration component 1702 to interact with a local host component (not shown). In one implementation, the host interface 1724 may use Peripheral Component Interconnect Express (PCIe), in conjunction with direct memory access (DMA), to exchange information with the local host component. The outer shell may also include various other features 1726, such as clock signal generators, status LEDs, error correction functionality, and so on.

Turning to soft shell 1704, router 1728 is for routing messages between various internal components of the acceleration component 1702, and between the acceleration component and external entities (e.g., via a transport component 1730). Each such endpoint is associated with a respective port. For example, router 1728 is coupled to memory controller 1720, host interface 1724, application logic 1706, and transport component 1730.

Transport component 1730 formulates packets for transmission to remote entities (such as other acceleration components), and receives packets from the remote entities (such as other acceleration components). A 3-port switch 1732, when activated, takes over the function of the bridge 1708 by routing packets between the NIC and TOR, and between the NIC or TOR and a local port associated with the acceleration component 1702.

Diagnostic recorder 1734 can store information regarding operations performed by the router 1728, transport component 1730, and 3-port switch 1732 in a circular buffer. For example, the information may include data about a packet's origin and destination IP addresses, host-specific data, time-stamps, etc. A technician may study a log of the information in an attempt to diagnose causes of failure or sub-optimal performance in the acceleration component 1702.

A plurality of acceleration components similar to acceleration component 1702 can be included in hardware acceleration plane 106.

Figure 17B:
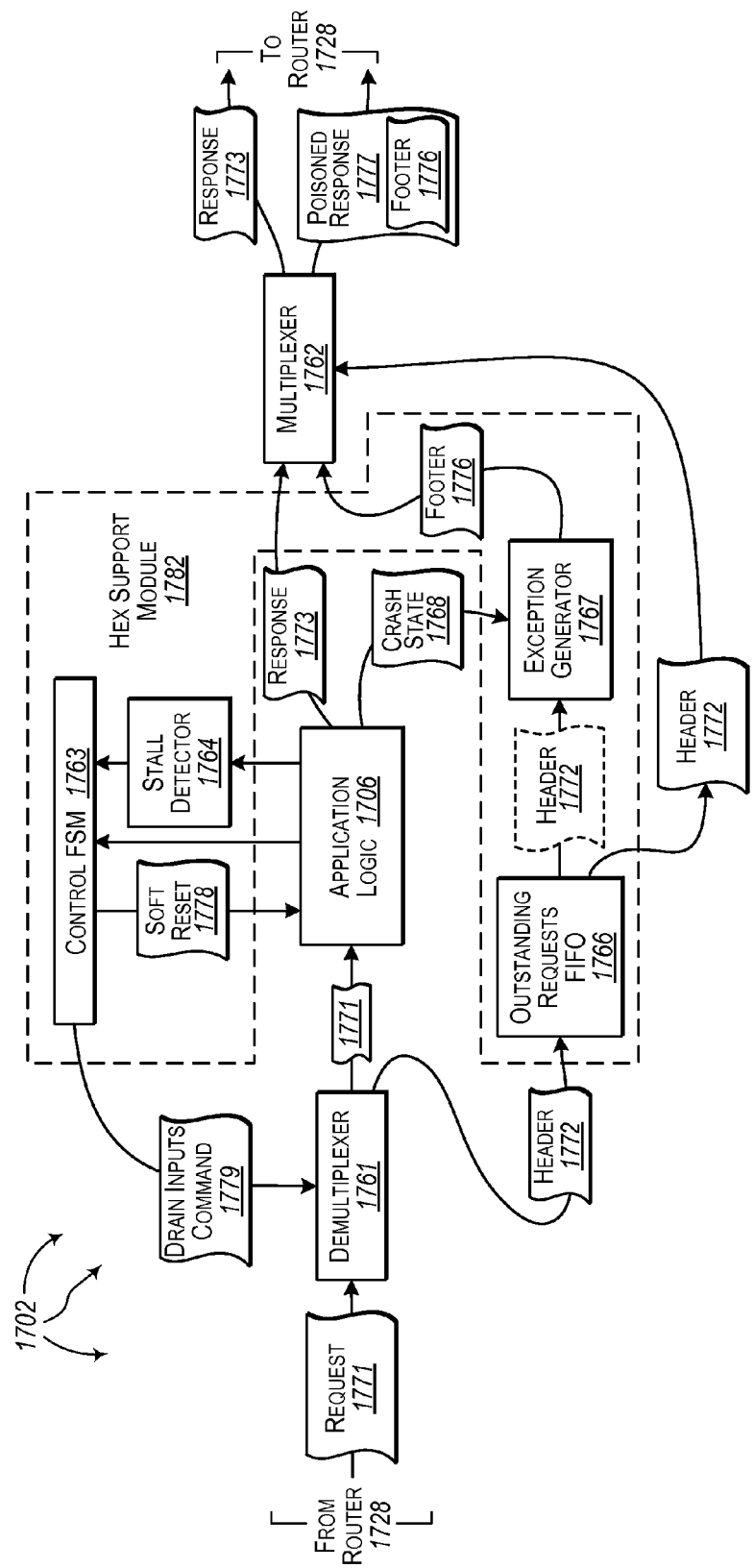
FIG. 17B illustrates an example of request processing at the acceleration component.

Turning to FIG. 17B, FIG. 17B illustrates an example of processing a request at acceleration component 1702. During normal operation, requests received from router 1728 are automatically forwarded to application logic 1706 (e.g., feature extraction). For example, demultiplexer 1761 can receive request 1771 (e.g., a document ranking request) from router 1728. Demultiplexer 1761 can send request 1771 to application logic 1706. Similarly, responses are forwarded on to router 1728. For example, multiplexer 1726 can receive response 1773 from application logic 1706. Multiplexer 1726 can forward response to router 1728. A requests arrive, their headers are enqueued into outstanding requests FIFO 1766. For example, demultiplexer 1761 can send header 1772 of request 1771 to outstanding requests FIFO 1766. Likewise, headers are dequeued as a response exits application logic 1706. For example, header 1772 can be dequeued when response 1773 exits application logic 1706.

Control Finite State Machine (FSM), monitors stalls in application logic 1706 and takes corrective action when appropriate. Outstanding requests FIFO 1766 tracks the total number of requests that have entered application logic 1706 but have not yet been completely processed. When an error occurs that causes application logic 1706 to "hang", a stall counter in stall detector 1764 begins incrementing when no new data is entering or leaving application logic 1706 and when the number of entries in outstanding requests FIFO 1766 is greater than zero.

When stall counter 1764 reaches a programmable threshold (e.g., set to a sufficiently high value but low enough so as to limit software timeouts), control FSM 1763 enters into a "hang" state. In the "hang" state, control FSM 1763 initiates a sequence of operations for surfacing an exception and returning application logic 1706 to normal operation. When a "hang" occurs, it is possible that partial requests and/or partial responses are stuck between router 1728 and application logic 1706. To handler requests, monitors are places the requests and response interfaces to determine the presence of partial requests/messages.

During a hang, various operations can be performed. If request 1771 is stuck between router 1728 and application logic 1706, control FSM 1763 can send drain inputs command to demultiplexer 1761 to drain the rest of the request 1771 from router 1728. Inputs and outputs ports of router 1728 can be disabled. Exception generator 1767 can collect and save crash state 1768 (if available) from application logic 1706. Crash state 1768 can include finite state machine states and other diagnostics, such as, for example, a count of total requests and responses. Finite state machine states can be accessed directly via hierarchical referencing (rather than wiring out all the signals to a top-level).

Control FSM 1763 can then being processing each entry in outstanding requests FIFO 1766 in order, represents a set of requests that require exception responses. On the first entry in outstanding requests FIFO 1766, exception generator 1767 can check to see if a partial response was already sent to the router. If so, the header of outstanding requests FIFO 1766 is discarded. If not, the saved header (e.g., header 1772) is read from outstanding requests FIFO 1766 and used to form a new response header.

Exception generator 1767 then poisons the response by appending a footer. For example, exception generator 1767 can poison response 1773 by appending footer 1776 to response 1773 resulting in poisoned response 1777. Optionally, if there is any crash state (e.g., crash state 1768) exception generator 1767 can also append the crash state top the poisoned response.

When outstanding requests FIFO 1766 is drained, control FSM 1763 attempts soft reset 1778 of application logic 1706. When soft reset 1778 is cleared, control FSM 1763 re-enables input and output ports between application logic 1706 and router 1728.

In some aspects, a system includes a hardware acceleration plane, a software plane, and a network infrastructure. The hardware acceleration plane includes a configurable fabric of a plurality of acceleration components. The plurality of acceleration components includes a group of interoperating acceleration components. Roles at each acceleration component in the group of interoperating acceleration components are linked together to compose a graph that provides service acceleration for a service.

The software plane includes a plurality of host components running software. The network infrastructure is shared by acceleration components in the hardware acceleration plane and host components in the software plane. The network infrastructure is used by acceleration components to communicate directly with one another. Local links connect acceleration components and host components (e.g., in the same server).

Each acceleration component in the group of interoperating acceleration components includes a monitor that can locally reset a role at the acceleration component. Locally resetting an acceleration component includes detecting an error in a role at the acceleration component by comparing actual behavior of the role to defined legitimate behavior for the role. Locally resetting an acceleration component includes pausing input to the role. Locally resetting an acceleration component includes sending a reset command to the role. Locally resetting an acceleration component includes receiving an acknowledgment from the role. The acknowledgement indicates that the role was successfully restarted. Locally resetting an acceleration component includes enabling input to the role in response to receiving the acknowledgment.

Monitors at different acceleration components can locally reset roles in parallel. As such, operation of the graph can be corrected at multiple acceleration components essentially simultaneously without a higher level service even becoming aware of the error(s).

In another aspect, a method for locally restoring a role at an acceleration component is performed. An error is detected in a role at an acceleration component by comparing actual behavior of the role to defined legitimate behavior for the role. The acceleration component is included in a group of interoperating acceleration components in a hardware acceleration plane. Roles at each acceleration component in the group of interoperating acceleration components are linked together to compose a graph that provides service acceleration for a service.

Input to the role is paused. A reset command is locally sent to the role within the acceleration component. An acknowledgment is received from the role. The acknowledgement indicates that the role was successfully restarted. Input to the role is enabled in response to receiving the acknowledgment.

In a further aspect, a computer program product for use at a computer system includes one or more computer storage devices having stored thereon computer-executable instructions that, in response to execution at a processor, cause the computer system to implement a method for a method for reconfiguring an acceleration component among interconnected acceleration components.

The computer program product includes computer-executable instructions that, in response to execution at a processor, cause the computer system to detect an error in a role at the acceleration component by comparing actual behavior of the role to defined legitimate behavior for the role. The acceleration component is included in a group of interoperating acceleration components in a hardware acceleration plane. Roles at each acceleration component in the group of interoperating acceleration components are linked together to compose a graph that provides service acceleration for a service.

The computer program product includes computer-executable instructions that, in response to execution at a processor, cause the computer system to pause input to the role. The computer program product includes computer-executable instructions that, in response to execution at a processor, cause the computer system to send a reset command to the role. The computer program product includes computer-executable instructions that, in response to execution at a processor, cause the computer system to receive an acknowledgment from the role. The acknowledgement indicates that the role was successfully restarted. The computer program product includes computer-executable instructions that, in response to execution at a processor, cause the computer system to enable input to the role in response to receiving the acknowledgment.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
   detecting an error in a role at an acceleration component;
   pausing input to the role;
   attempting to reset the role;
   determining that the reset failed to address the detected error;
   loading an image file at the acceleration component to restore the role;
   determining that loading the image file successfully restored the role; and
   enabling input to the role.

2. The method of claim 1, wherein the acceleration component comprises one of: a Field Programmable Gate Array (FPGA), a Graphics Processing Unit (GPU), an Application Specific Integrated Circuit (ASIC), a programmable logic device (PLD), a Programmable Array Logic (PAL) device, a Generic Array Logic (GAL) device, or a massively parallel processor array (MPPA) device.

3. The method of claim 1, wherein loading an image file at the acceleration component to restore the role comprises loading an image file to restore a role that provides service acceleration for a service selected from among: document ranking, data encryption, data compression, speech translation, and computer vision.

4. The method of claim 1, wherein loading an image file at the acceleration component to restore the role comprises loading an image file at an acceleration component included in a configurable fabric of Field Programmable Gate Arrays (FPGAs).

5. The method of claim 1, wherein detecting an error comprises detecting one of: a timeout at the role, a divide by zero exception at the role, or inappropriate characteristics in output from the role.

6. The method of claim 1, wherein attempting to reset the role comprises sending a command to reset internal state of the acceleration component.

7. The method of claim 1, wherein detecting an error in a role at the acceleration component comprises detecting an error in one or more of: an array of programmable logic blocks in a Field Programmable Gate Array (FPGA) or a hierarchy of reconfigurable interconnects in the Field Programmable Gate Array (FPGA).

8. The method of claim 1, wherein determining that loading the image file successfully restored the role comprises receiving an acknowledgement from the role.

9. The method of claim 1, wherein determining that the reset failed comprises failing to receive an acknowledgment from the role in a specified time period.

10. The method of claim 1, further comprising prior to loading the image file, receiving an instruction from an external component to load the image file.

11. A computer program product for implementing a method for restoring a role at an acceleration component, the computer program product comprising one or more computer hardware storage devices having stored thereon computer-executable instructions that, in response to execution at a processor, cause the method to be performed, comprising:
   detect an error in a role at the acceleration component;
   pause input to the role;
   send a reset command to the role;
   determine that the reset failed to address the detected error;
   reload an image file to restore the role at the acceleration component;
   determine that the image file was successfully loaded at the acceleration component to restore the role; and
   enable input to the role.

12. The computer program product of claim 11, wherein computer-executable instructions that, in response to execution, detect an error in a role at the acceleration component comprise computer-executable instructions that, in response to execution, detect one of: a timeout at the role, a divide by zero exception at the role, or inappropriate characteristics in output from the role.

13. The computer program product of claim 11, wherein computer-executable instructions that, in response to execution detect an error in a role at the acceleration component comprise computer-executable instructions that, in response to execution, detect an error in one or more of: an array of programmable logic blocks in a Field Programmable Gate Array (FPGA) or a hierarchy of reconfigurable interconnects in the Field Programmable Gate Array (FPGA).

14. The computer program product of claim 11, further comprising computer-executable instructions that, in response to execution, prior to reloading the image file, receive an instruction from an external component to load the image file.

15. The computer program product of claim 11, wherein computer-executable instructions that, in response to execution, reload an image file comprise computer-executable instructions that, in response to execution, reload an image file to restore a role that provides service acceleration for a service selected from among: document ranking, data encryption, data compression, speech translation, and computer vision.

16. An acceleration component, the acceleration component including:
a plurality of programmable logic blocks, from among an array of programmable logic blocks, and at least one reconfigurable interconnect, from among a hierarchy of reconfigurable interconnects, interoperating to execute instructions loaded into the acceleration component to:

detect an error in a role at the acceleration component;
pause input to the role;
attempt to reset the role;
determine that the reset failed to address the detected error;
notify a host component to reload an image file to restore the role at the acceleration component;
receive an acknowledgment from the role indicating that the role was successfully restarted; and
enable input to the role.

17. The system of claim 16, wherein the acceleration component comprises a Field Programmable Gate Array (FPGA).

18. The system of claim 16, wherein the acceleration component is included in a graph that provides a service, the service selected from among document ranking, data encryption, data compression, speech translation, or computer vision.

19. The system of claim 16, further comprising a local link connecting the acceleration component and the host component.

20. The system of claim 19, wherein the plurality of programmable logic blocks and at least one reconfigurable interconnect interoperating to detect an error comprise the plurality of programmable logic blocks and at least one reconfigurable interconnect interoperating to detect one of: a timeout at the role, a divide by zero exception at the role, or inappropriate characteristics in output from the role.

* * * * *